(12) United States Patent
Jain et al.

(10) Patent No.: US 11,967,010 B2
(45) Date of Patent: Apr. 23, 2024

(54) DIGITAL ARTBOARD ANGULAR SNAPPING GUIDES

(71) Applicant: Adobe Inc., San Jose, CA (US)

(72) Inventors: Arushi Jain, Delhi (IN); Praveen Kumar Dhanuka, Howrah (IN)

(73) Assignee: Adobe Inc., San Jose, CA (US)

( * ) Notice: Subject to any disclaimer, the term of this patent is extended or adjusted under 35 U.S.C. 154(b) by 139 days.

(21) Appl. No.: 17/567,558

(22) Filed: Jan. 3, 2022

(65) Prior Publication Data

US 2022/0130088 A1 Apr. 28, 2022

Related U.S. Application Data

(63) Continuation of application No. 17/080,015, filed on Oct. 26, 2020, now Pat. No. 11,250,607.

(51) Int. Cl.
*G06T 11/60* (2006.01)
*G06T 1/60* (2006.01)
*G06T 11/20* (2006.01)

(52) U.S. Cl.
CPC ............. *G06T 11/60* (2013.01); *G06T 1/60* (2013.01); *G06T 11/203* (2013.01); *G06T 2200/24* (2013.01)

(58) Field of Classification Search
CPC ......... G06T 11/60; G06T 1/60; G06T 11/203; G06T 2200/24; G06T 19/20; G06T 7/70; G06T 19/003; G06T 2219/024; G06V 30/224; G06V 30/1423
See application file for complete search history.

(56) References Cited

U.S. PATENT DOCUMENTS

| | | | |
|---|---|---|---|
| 2011/0181528 A1* | 7/2011 | Capela | G06F 3/04845 345/173 |
| 2012/0026100 A1* | 2/2012 | Migos | G06F 3/0412 345/173 |
| 2016/0357356 A1 | 12/2016 | Migos et al. | |

OTHER PUBLICATIONS

Rick Moore; Adobe Press; "The Building Blocks of UI Design with Adobe Illustrator"; Aug. 23, 2012; https://www.adobepress.com/articles/article.asp?p=1929168&seqNum=3.

(Continued)

*Primary Examiner* — Xilin Guo
(74) *Attorney, Agent, or Firm* — Keller Preece PLLC

(57) ABSTRACT

The present disclosure relates to systems, non-transitory computer-readable media, and methods for providing angular snapping guides to efficiently, accurately, and flexibly align user interactions and editing operations to existing angular linear segments of digital design objects in a digital design document. In particular, in one or more embodiments, the disclosed systems determine target angular linear segments for presentation of angular snapping guides by generating angular bin data structures based on orientation and signed distances of angular linear segments within the digital design document. Accordingly, in one or more embodiments, the disclosed systems can efficiently search these angular bin data structures based on angles and signed distances corresponding to user interactions. Further, in some embodiments, the disclosed systems identify a target angular linear segment from the angular bins and provide an angular snapping guide corresponding to the target angular linear segment during transformation of the digital design document.

20 Claims, 19 Drawing Sheets

(56) References Cited

OTHER PUBLICATIONS

U.S. Appl. No. 17/080,015, Jun. 25, 2021, Preinterview 1st Office Action.
U.S. Appl. No. 17/080,015, Jul. 26, 2021, 1st Action Office Action.
U.S. Appl. No. 17/080,015, Oct. 13, 2021, Notice of Allowance.

* cited by examiner

DIGITAL ARTBOARD ANGULAR SNAPPING GUIDES

CROSS-REFERENCE TO RELATED APPLICATIONS

The present application is a continuation of U.S. application Ser. No. 17/080,015, filed on Oct. 26, 2020. The aforementioned application is hereby incorporated by reference in its entirety.

BACKGROUND

Recent years have seen significant development in hardware and software platforms that utilize digital tools to generate and manipulate design objects within digital design spaces. For example, conventional content management systems can create complex design shapes and then transform these shapes within a design space to generate enhanced digital images. More specifically, conventional content management systems can monitor user interaction with a digital object and transform digital objects based on the magnitude of received user input. Although conventional systems provide tools for creating and modifying design objects, such systems have a number of technical shortcomings, particularly with regard to flexibility, accuracy, and efficiency of operation.

BRIEF SUMMARY

Embodiments of the present disclosure provide benefits and/or solve one or more of the foregoing or other problems in the art with systems, non-transitory computer-readable media, and methods for utilizing angular snapping guides to efficiently, accurately, and flexibly align user interactions and digital image editing functions to angular linear segments of digital design objects in a digital document space. In particular, in one or more embodiments, the disclosed systems extract angular linear segments and corresponding snappable locations from a digital design document. Further, the disclosed systems can generate and utilize an efficient angular binning data structure to store and analyze snappable locations in real-time during user interaction with a digital design document. In particular, in one or more embodiments the disclosed systems generate an architecture of angular bins organized according to angular ranges and signed distance from a reference point and then utilizes the angular bins to identify a target linear segment in a digital document. Moreover, the disclosed systems then rotate or translate subject angular linear segments (or cursor movements) to align with the target angular linear segment. Indeed, in one or more embodiments, the disclosed systems rotate subject angular linear segments to create parallel alignments across digital design objects. Similarly, the disclosed systems can translate subject angular linear segments to create colinear alignments between digital design objects. Thus, the disclosed systems can efficiently and flexibly snap digital design objects or cursor movements within the digital design document onto a variety of precise snappable locations in real-time to assist in generating enhanced digital design documents and images.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
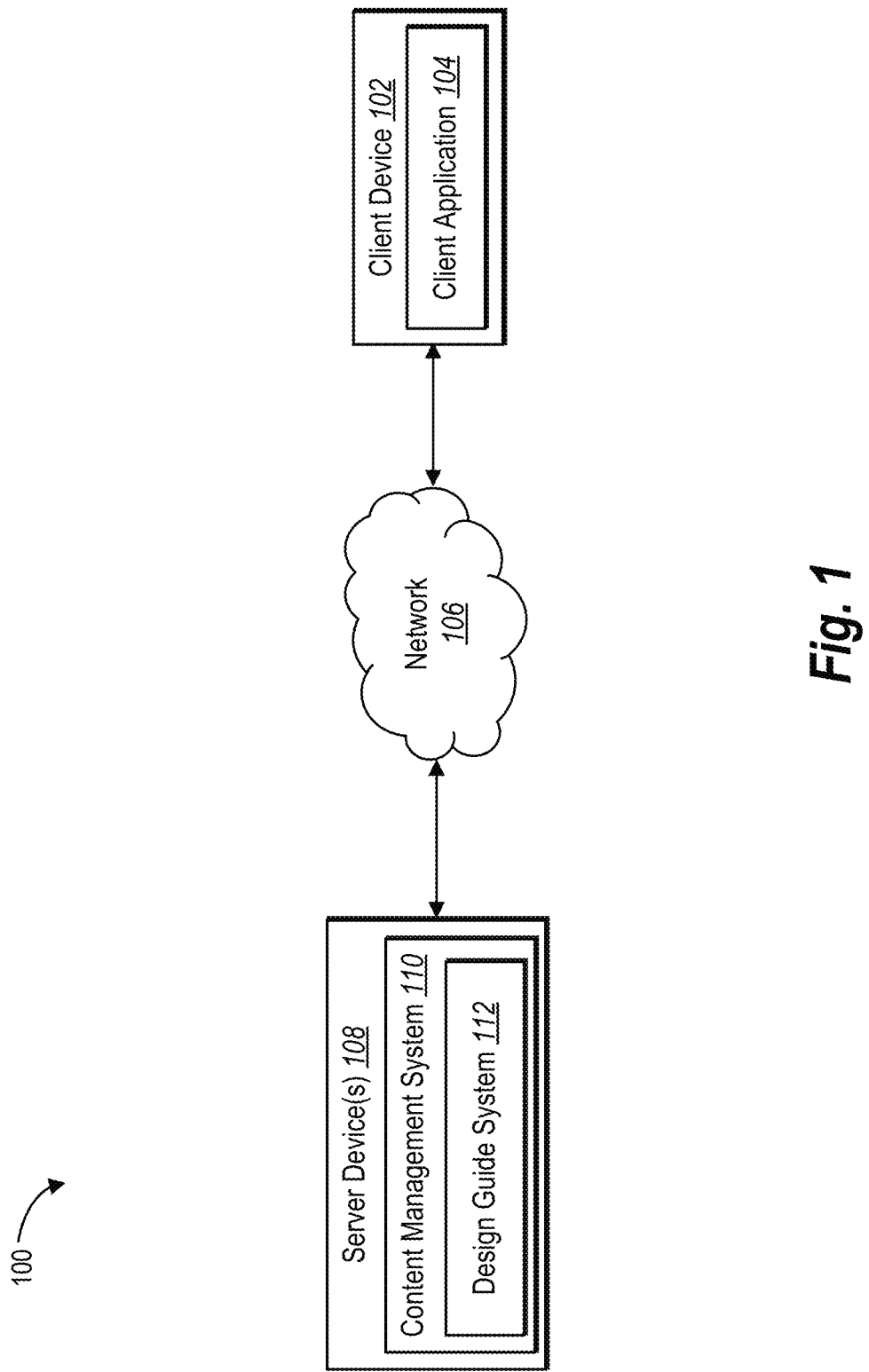
FIG. 1 illustrates a diagram of a system environment in which a design guide system can operate in accordance with one or more embodiments.

This disclosure describes one or more embodiments of a design guide system that efficiently, accurately, and flexibly generates and utilizes angular snapping guides in real-time to align user interactions and edits to angular linear segments of digital design objects in a digital design document. In one or more embodiments, the design guide system extracts snappable locations from angular linear segments of a digital design document and utilizes these snappable locations to align subject angular linear segments and cursor movements to existing digital design objects. For example, the design guide system can rotate subject angular linear segments so that they are parallel to existing angular linear segments or translate subject angular linear segments so that they are collinear with existing angular linear segments. In addition, in some embodiments the design guide system improves the efficiency of identifying these snappable locations by utilizing an efficient data structure of angular bins organized based on signed distance to a reference point within the digital document. By analyzing these angular bin data structures, the design guide system provides angular snapping guides to efficiently and accurately align cursor movements, rotations, translations, or other image editing functions with angular linear segments of digital design objects in a digital design document.

To illustrate, in one or more embodiments, the design guide system assigns angular linear segments in a digital design document to angular bins (e.g., based on angular ranges and the corresponding angles of individual linear segments). Further, in some embodiments, the design guide system selects a target angular linear segment for generation of an angular snapping guide in response to user interaction with the digital design document. To illustrate, in one or more embodiments, the design guide system identifies an angular bin based on an angle corresponding to the user interaction. Further, in some embodiments, the design guide system identifies the target angular linear segment based on a corresponding signed distance relative to the user interaction. By isolating a target angular linear segment based on angular bins and signed distance, in one or more embodiments the design guide system efficiently identifies a target angular linear segment for generating an angular snapping guide. Indeed, in one or more embodiments, the design guide system provides an angular snapping guide during the user interaction to align the user interaction to the targe angular linear segment.

As just mentioned, in some embodiments, the design guide system extracts and analyzes angular linear segments in a digital design document to generate angular snapping guides. The design guide system can extract a variety angular linear segments from digital design objects. For example, in some embodiments, the design guide system extracts linear segments from linear paths (e.g., a straight line vector in a digital document), slightly curved paths (e.g., near-linear segments), or tangential segments of curves within a digital design document. Accordingly, in some embodiments the design guide system extracts angular linear segments and generates angular snapping guides to align digital objects, even if the digital design objects do not initially reflect perfectly linear paths or segments.

In one or more embodiments, upon identifying linear segments in a digital design document, the design guide system assigns the angular linear segments to angular bins. In particular, the design guide system can determine angular bins, each corresponding to a particular angular range. For example, the design guide system can generate angular bins with angular ranges corresponding to a snapping tolerance within the digital design document. In some embodiments, the design guide system then determines angles corresponding to the angular linear segments and assigns the angular linear segments to angular bins by comparing the slope of each angular linear segment with the angular range for each bin.

In addition to generating angular bins and assigning angular linear segments, in one or more embodiments the design guide system also arranges the angular linear segments within the angular bins. In particular, in some embodiments, the design guide system sorts the angular linear segments within the angular bins based on angle and signed distance. For instance, for each angular linear segment, the design guide system determines a signed distance from a reference point in a digital design document (e.g., a signed distance relative to an origin in the digital design document).

Upon determining signed distances, in one or more embodiments the design guide system then sorts the linear angular linear segments within the angular bins based on the signed distances (e.g., segments with the same angle, or within a threshold angle similarity, are sorted in ascending or descending order based on signed distance).

As referenced above, in some embodiments the design guide system utilizes this angular binning data structure to efficiently identify target angular linear segments and generate angular snapping guides. For example, in response to detecting user interaction with a subject angular linear segment (e.g., movement of an existing segment or creation of a new segment), the design guide system detects an angle corresponding to the user interaction. Without having to search every angular linear segment in the digital design document, in some embodiments the design guide system efficiently identifies a target angular linear segment for generating an angular snapping guide by first identifying one or more angular bins corresponding to the angle of the user interaction. Specifically, in one or more embodiments, the design guide system compares the angle with the angular ranges of the angular bins to select a set of three angular bins to search.

In addition, in one or more embodiments the design guide system selects a target angular linear segment from these angular bins by utilizing a particular angle and signed distance. For example, because similar angles within the angular bins were previously sorted by signed distance, the design guide system efficiently isolates a target angular linear segment that is relevant to the user interaction. To illustrate, the design guide system determines an angle and signed distance between the user interaction (e.g., a subject angular linear segment) and a reference point in the digital design document. In one or more embodiments, the design guide system then performs an efficient binary search within selected angular bins to identify a target angular linear segment that is closest to the user interaction based on the signed distance.

Upon identifying a target angular linear segment, in some embodiments the design guide system then generates an angular snapping guide to align the user interaction to the target angular linear segment and provide a visual indication to the user within the design user interface. To illustrate, in some embodiments the design guide system generates a visual representation of an angular snapping guide as a dashed line within the digital design document to indicate (e.g., provide a hint) to the user that the design guide system is snapping a user interaction to a particular location/orientation of an existing digital design object. Thus, in one or more embodiments, the design guide system provides visual hints and snaps cursor movements or other editing functions onto angular snapping guides.

In one or more embodiments, the design guide system dynamically monitors a digital design document to determine when a user interaction moves within a snapping tolerance of a snappable location. In one or more embodiments, the design guide system utilizes different snapping tolerances for different types of transformation, such as an angular snapping tolerance and/or a collinearity snapping tolerance. In some embodiments, the design guide system generates and surfaces the angular snapping guide upon determining that the user interaction comes within a snapping tolerance of a target angular linear segment.

As mentioned above, the design guide system can generate angular snapping guides for a variety of different user interactions and digital object transformations. In one or more embodiments, the design guide system identifies a target angular linear segment and provides angular snapping guides during a rotation transformation. To illustrate, in some embodiments, the design guide system receives a rotation of a subject angular linear segment. The design guide system determines an angular snapping range based on an angular snapping tolerance relative to the slope of the subject angular linear segment. Moreover, the design guide system can select a target angular linear segment by identifying one or more target angular bins and then identifying candidate angular linear segments within the one or more angular bins having the closest corresponding angular orientations. Further, in some embodiments, the design guide system determines a target angular linear segment by comparing signed distances of these angular linear segments with a signed distance of the transformed angular linear segment. If the target angular linear segment falls within the angular snapping range, the design guide system can automatically snap the rotation of the subject angular linear segment to align with the target angular linear segment.

Further, in some embodiments, the design guide system identifies a target angular linear segment and provides angular snapping guides during a translation transformation. More specifically, in one or more embodiments, the design guide system provides an angular snapping guide during a translation to snap a subject angular linear segment to a collinear (or near-collinear) alignment relative to a target angular linear segment. Indeed, in one or more embodiments the design guide system applies a collinearity snapping threshold to identify near-collinear target angular linear segments and corresponding angular snapping guides.

To illustrate, in some embodiments the design guide system identifies a translation transformation of a subject angular linear segment having a particular angle. The design guide system can identify one or more target angular bins based on the current angle of the subject angular linear segment. Moreover, the design guide system can search for candidate angular linear segments within the one or more target angular bins utilizing a signed distance upper and lower bound (e.g., a signed distance range). The design guide system can then select a target angular linear segment from the candidate linear segments by applying a collinear snapping threshold. Specifically, in some embodiments the design guide system applies the collinear snapping threshold by comparing the angle of the subject angular linear segment, an angle of a candidate linear segment, a joining angle between the two segments, and the collinear snapping threshold. In this manner, the design guide system can efficiently identify a target angular linear segment that is colinear (or near-colinear) to a subject angular linear segment and align the subject angular linear segment to the target angular linear segment.

Additionally, in one or more embodiments, the design guide system 112 generates angular snapping guides to facilitate cursor snapping (e.g., snapping of a cursor, even if the cursor is not directing a current image editing function). More specifically, in some embodiments, the design guide system 112 determines a set of candidate angular linear segments by projecting a ray at a representative angle for each angular bin through the cursor. Moreover, in one or more embodiments, the design guide system 112 determines a target angular linear segment from the target angular bin based on distance/collinearity conditions between candidate linear segments and the current cursor position.

Further, in some embodiments, the design guide system generates angular snapping guides during partial transformations of a digital design object. In one or more embodiments, the design guide system receives user input to modify (e.g., scale or re-shape) one but not all angular linear segments of a digital design object. In response to receiving such a transformation, in one or more embodiments, the design guide system tracks the subject angular linear segment with regard to the snapping tolerance of a variety of angular linear segments in the digital design object. Accordingly, the design guide system can snap user interactions to angular snapping guides, even when only partially modifying certain linear segments of a digital design object.

To efficiently provide angular snapping guides in real-time, in some embodiments the design guide system generates and updates a cache of angular linear segment. More specifically, in one or more embodiments, the design guide system caches locations of angular linear segments in a digital design document. Further, in some embodiments, the design guide system identifies a transformation in the digital design document. In response to receiving the transformation, in one or more embodiments, the design guide system applies the transformation to the cached angular linear segments. Thus, the design guide system can update the angular snapping guides for the digital design document based on the updated cached angular linear segments and avoid repetitive, unnecessary analysis of all angular linear segments in updating angular bins.

As suggested above, conventional content management systems exhibit a number of technical deficiencies with regard to flexibility, accuracy, and efficiency. For example, many conventional content management systems lack flexibility in snapping digital design objects in digital design documents. To illustrate, many content management systems snap digital design objects to horizontal or vertical lines (e.g., based a bounding box of the digital design object). However, utilizing a bounding box to align digital design objects limits conventional systems to alignment on only a horizontal or vertical axis.

The inflexibility of conventional systems also undermines accuracy. Indeed, conventional systems fail to snap digital design objects based on non-horizontal and non-vertical angular linear segments, even though these angles can define the visual features of a digital design. Accordingly, conventional systems often result in manipulation through clumsy user interface controls that cannot accurately and precisely align digital design objects. To illustrate, conventional systems often require repetitive user interactions to rotate and translate a digital design object to roughly match an existing digital design object. However, the resulting modifications are seldom accurate in that angles and alignments are slightly skewed due to the rough controls of most user interfaces.

Further, many conventional content management systems lack efficiency in snapping digital design objects. Some conventional content management systems require iteratively checking each digital design object and segment for alignment and/or proximity as a user interacts with and modifies digital design objects in a digital document. Such repetitive analysis requires inordinate time and computing resources. These inefficiencies of conventional systems make conventional systems incapable of snapping digital design objects in digital design documents with even moderate quantities of angular linear segments. Indeed, given that digital design documents routinely include thousands of potential angular linear segments, the inefficiencies of conventional systems make real-time snapping to angular linear segments of various slopes computationally infeasible.

Moreover, as alluded to above, conventional content management systems are inefficient because they require excessive user interface interactions. Indeed, to align segments utilizing conventional systems requires iterative attempts move and rotate digital design objects or segments utilizing press and drag sequences via a user interface. Given the difficulty of alignment using course user interface controls, conventional systems generally receive an inordinate number of user interactions via user interfaces, which unnecessarily increase the burden on implementing computer resources.

The design guide system provides many advantages and benefits over conventional systems and methods. For example, the design guide system improves flexibility relative to conventional content management systems. Indeed, the design guide system can snap user interactions to subject angular linear segments, regardless of orientation or angle. Thus, the design guide system can align a cursor to existing digital design objects, create new digital design objects that seamlessly align to existing linear segments, and modify digital design objects to align to other digital design objects. Further, the design guide system can accurately generate angular snapping guides during a variety of types of transformations (and a variety of types of linear segments, including tangential segments of curves or near-linear curves). Accordingly, the design guide system can provide improved functionality and flexibility to implementing computing systems in transforming digital design objects.

In addition, the design guide system improves accuracy relative to conventional systems. Indeed, the design guide system can accurately generate angular snapping guides that precisely align to angular linear segments at a variety of angles. Accordingly, the design guide system can improve the rough appearance of digital design documents resulting from conventional systems. In particular, the design guide system can generate enhanced digital designs that are significantly improved with regard to the precision of parallelism and collinearity.

Additionally, the design guide system can improve efficiency relative to conventional systems. More specifically, by generating and processing angular bin data structures (e.g., arranged internally according to signed distance), the design guide system can identify target angular linear segments and generate angular snapping guides while utilizing reduced processing resources. Specifically, the design guide system can avoid repetitive analysis of each angular linear segment in a digital design document, but can quickly and efficiently isolate target angular segments from angular bins (e.g., utilizing binary search protocols), to identify the target angular segments most likely to align to a subject angular linear segment. This efficiency enables real-time generation and presentation of angular snapping guides to generate modified digital design documents during image cursor movements or digital image editing operations.

In addition, the design guide system further improves efficiency by significantly reducing the number of user interactions relative to conventional systems. Indeed, by snapping user interactions to angular snapping guides, the design guide system can precisely align user interactions to existing angular linear segments with a single press and drag interaction. The design guide system can significantly reduce the repetitive interactions and wasted computing resourced involved in attempting to align digital design objects through coarse user interface controls.

As illustrated by the foregoing discussion, the present disclosure utilizes a variety of terms to describe features and advantages of the design guide system. Additional detail is now provided regarding the meaning of such terms. For example, as used herein, the term "angular linear segment" refers to a line or linear path extracted or identified from a digital design document. In particular, the term "angular linear segment" can include a linear path in a digital design object. An angular linear segment can also include a near-straight curve (e.g., a curved path below a threshold curvature). Similarly, an angular linear segment can include a tangential line to a curve including in a digital design document. Further, an angular linear segment can include a line segment having a non-vertical and non-horizontal slope relative to an axis of a digital design document.

Additionally, as used herein, the term "target angular linear segment" refers to an angular linear segment utilized for generating an angular snapping guide. In particular, the term "target angular linear segment" can include an angular linear segment identified for generation of an angular snapping guide based on signed distance and/or slope. To illustrate, a target angular linear segment can include a line segment within a snapping tolerance of a subject angular linear segment, having collinearity or near-collinearity of a subject angular linear segment, or otherwise selected for generation of an angular snapping guide with regard to a transformed angular linear segment. In some embodiments, a target angular linear segment is selected from a set of candidate angular linear segments.

Further, as used herein, the term "subject angular linear segment" refers to a modified line segment (e.g., a modified line segment analyzed to align with or "snap" to another angular line segment). In particular, the term "subject angular linear segment" can include a linear segment undergoing a transformation and being analyzed for presentation of angular snapping guides. To illustrate, a subject angular linear segment can include any angular linear segment transformed during a modification to a digital design document where the subject angular linear segment is analyzed to determine if the subject angular linear segment is to be snapped to an angular snapping guide.

Also, as used herein, the term "digital design object" refers to a digital shape, digital graphic, digital text, digital vector, digital image or other digital visual object within a digital design document. To illustrate, a digital design object can include a movable and/or editable vector object comprising a plurality of vector segments within a digital design document. For example, in creating a digital design document that portrays a plurality of star shapes, each star shape would be a digital design object.

Additionally, as used herein, the term "digital design document" refers to a digital file or digital design space for portraying/modifying digital media. In particular, a digital design document can include a digital file defining a digital media item or a digital design space (e.g., a user interface) for creating/displaying a digital media item). To illustrate, in utilizing a software application for generating a digital image comprising a variety of digital design objects, a digital design document can include the file defining the digital image being designed (e.g., a PDS file) within the software application. A digital design document can also include the digital design space (e.g., the user interface) utilized to create and/or display the digital image within the software application.

Further, as used herein, the term "angular bin" refers to a partition or group of angular linear segments. In particular, the term "angular bin" can include a partition of angular linear segments having similar slopes in a digital design document. For example, an angular bin can include a set of angular linear segments falling within an angular range. Relatedly, as used herein, the term "angular range" refers to a span of angles (e.g., a span of angles defining an angular bin). Further, as used herein, a "target angular bin" refers to an angular bin that the design guide system identifies as potentially including a target angular linear segment. For example, a target angular bin includes an angular bin that the design guide system selects as relevant to a subject angular linear segment based on the angular range of the angular bin.

Also, as used herein, the term "angular snapping guide" refers to a digital element for aligning a user interaction or image editing operation. In particular, an angular snapping guide can include a visual indicator for aligning or snapping a user interaction or editing operation to a digital object (or angular linear segment). An angular snapping guide can also include an automatic transformation of an object, segment, or cursor position to align with an existing angular visual segment. Accordingly, an angular snapping guide can include an automatic transformation and/or a visual user interface representation indicating the transformation. For example, an angular snapping guide can include a snapping guide that the design guide system generates in real-time in response to receiving a translation in the digital design document. As described above, the design guide system can provide angular snapping guides that align with angular linear segments of a variety of shapes and/or slopes. To illustrate, an angular snapping guide can include a non-vertical and non-horizontal digital element for aligning digital design objects to non-vertical and non-horizontal slopes. For example, an angular snapping guide can align an angular linear segment of a digital design object to the angle of an existing digital design object. Further, an angular snapping guide can align a cursor to align with an angular linear segment of a digital design object. Additionally, the design guide system can utilize angular snapping guides to move a digital design object so that subject angular linear segments of the digital design object are collinear (or near collinear) to angular linear segments of other digital design objects.

Similarly, as used herein, the term "angular snapping range" refers to a range of angles for snapping or aligning a subject angular linear segment to an angular snapping guide. In particular, the term "angular snapping range" can include a range of angles surrounding the slope of a subject angular linear segment for snapping the subject angular linear segment to a target angular linear segments. To illustrate, an angular snapping range can include a range of angles for a target angular linear segment that the design guide system determines based on an angular snapping tolerance relative to an angle of the subject angular linear segment.

Additionally, as used herein, the term "signed distance" refers to a distance corresponding to an angular linear segment within a digital design document. In particular, the term "signed distance" can include the distance between an angular linear segment and a reference point (e.g. the origin) within a digital design document. To illustrate, a signed distance can include the shortest distance between a reference point (e.g. the origin) within a digital design document and an angular linear segment.

Also, as used herein, the term "angular snapping tolerance" refers to a threshold for snapping a transformed angular linear segment onto an angular snapping guide during rotation. In particular, the term "angular snapping tolerance" can include an angular distance from a snappable location at which the design guide system will snap the design guide system onto an angular snapping guide.

Further, as used herein, the term "collinearity snapping tolerance" refers to a threshold for snapping a transformed angular linear segment onto an angular snapping guide during translation, scaling, reshaping, and/or various transformations. In particular, the term "collinearity snapping tolerance" can include a degree of collinearity or near-collinearity at which the design guide system will snap a subject angular linear segment onto an angular snapping guide. To illustrate, a collinearity snapping tolerance can include a collinearity error between a target angular linear segment and a subject angular linear segment for the design guide system to snap the subject angular linear segment onto an angular snapping guide corresponding to the target angular linear segment.

Additionally, as used herein, the term "joining angle" refers to an angle to join two line segments. In particular, the term "joining angle" can include an angle of a line joining endpoints of angular linear segments within a digital design document. To illustrate, a joining angle can include an angle of a joining line between an endpoint of a target angular linear segment and an endpoint of a subject angular linear segment.

Additional detail regarding the design guide system will now be provided with reference to the figures. For example, FIG. 1 illustrates a schematic diagram of an example system environment 100 (or "system 100") for implementing a design guide system 112 in accordance with one or more embodiments. Specifically, FIG. 1 illustrates the system 100 including a client device 102, a client application 104, a network 106, server device(s) 108, a content management system 110, and a design guide system 112. Although FIG. 1 illustrates one client device, in alternative embodiments, the system 100 includes a different number of client devices and corresponding users. Similarly, although FIG. 1 illustrates a particular arrangement of the client device 102, the network 106, the server device(s) 108, and the third-party server(s), various arrangements are possible.

As shown in FIG. 1, the client device 102 includes the client application 104. As discussed below with regard to FIG. 15, in one or more embodiments, the client device 102 includes a variety of types of computing devices. In some embodiments, the client application 104 includes one or more software applications that allow a corresponding user to view, manage, modify, edit, generate, send, and/or receive digital content, including digital design documents. For example, in some embodiments, the client application 104 is a software application installed on the client device 102 or a web-based application accessed via the server device(s) 108.

Figure 15:
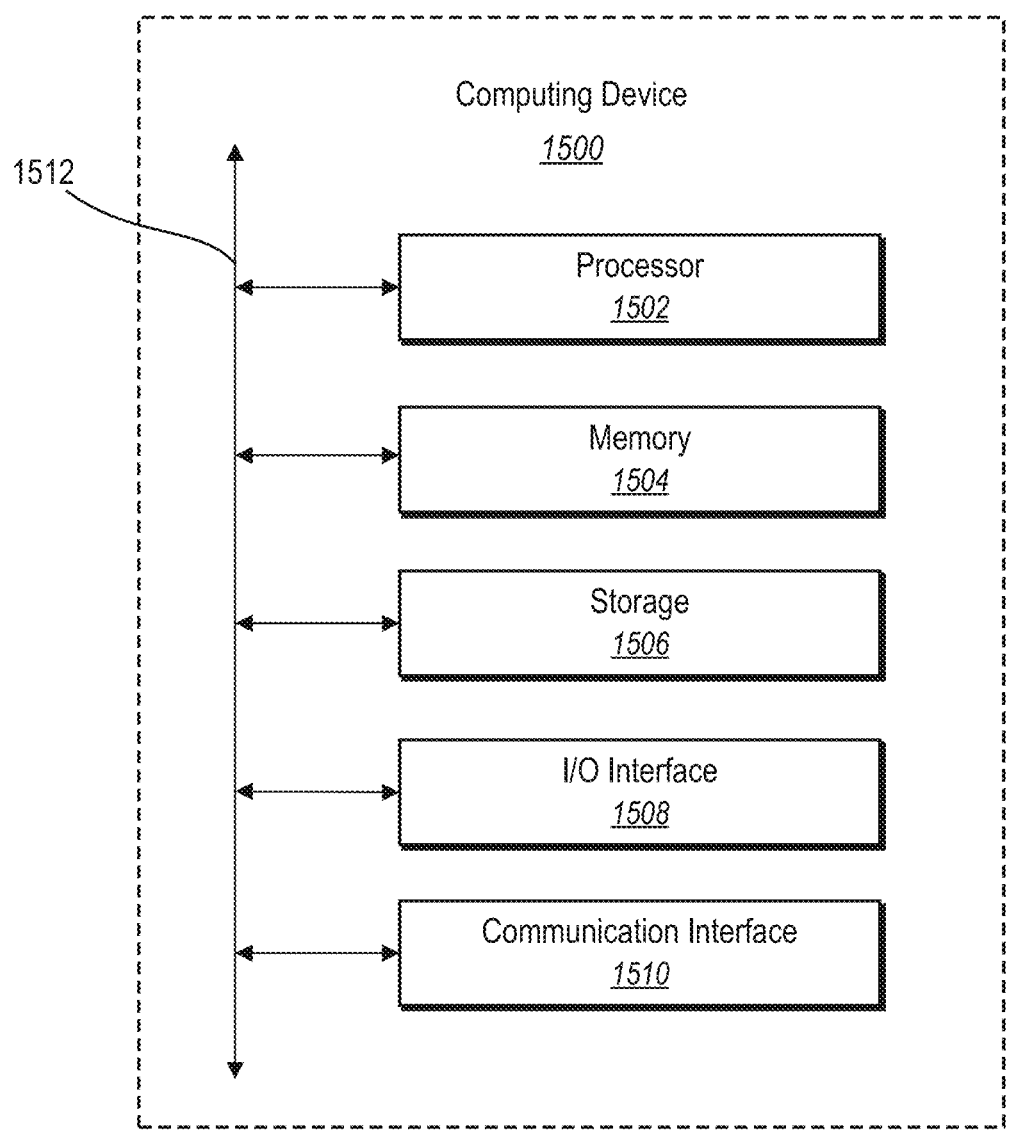
FIG. 15 illustrates a block diagram of an example computing device for implementing one or more embodiments of the present disclosure.

As further shown in FIG. 1, the client device 102 and the server device(s) 108 may be communicatively coupled with each other directly or indirectly, such as coupling through the network 106, which is described further in relation to FIG. 15. The client device 102 and the server device(s) 108 may include a variety of computing devices, including one or more computing devices as discussed further below in relation to FIG. 15. In some embodiments, the server device(s) 108 comprise a data server, a communication server, or a web-hosting server and generates, stores, receives, and/or transmits a variety of types of data, including digital images and/or modifications to digital images. In certain implementations, the client device 102 comprises a computing device that allows a corresponding user to generate, edit, receive, and/or send digital images including digital objects.

Additionally, as shown in FIG. 1, the server device(s) 108 includes the content management system 110 and the design guide system 112. In general, the content management system 110 facilitates the storage, rendering, and maintenance of various types of digital content. For example, the content management system 110 manages digital design documents including digital objects. Among other things, in some implementations, the content management system 110 provides digital design documents to the design guide system 112.

In addition to management of various digital content, as shown in FIG. 1, the content management system 110 includes the design guide system 112. In some embodiments, the design guide system 112 generates, manages, and utilizes angular snapping guides for digital design documents. More specifically, in one or more embodiments, the design guide system 112 identifies angular linear segments in a digital design document and assigns the angular linear segments to angular bins. In some embodiments, the design guide system 112 utilizes the angular bins to provide angular snapping guides dynamically and in real-time during transformation of the digital design document. Accordingly, in one or more embodiments, the design guide system 112 generates modified digital design documents based on user interaction with the provided angular snapping guides.

As illustrated, the design guide system 112 may be implemented by the individual elements of the system 100. Although FIG. 1 illustrates the design guide system 112 implemented within the server device(s) 108, in one or more alternative embodiments, the components of the design guide system 112 are implemented in other components of the system 100. For instance, in some embodiments, the client device 102 implements the design guide system 112 and performs (in whole or in part) the functions, methods, and processes of the design guide system 112.

Figure 2:
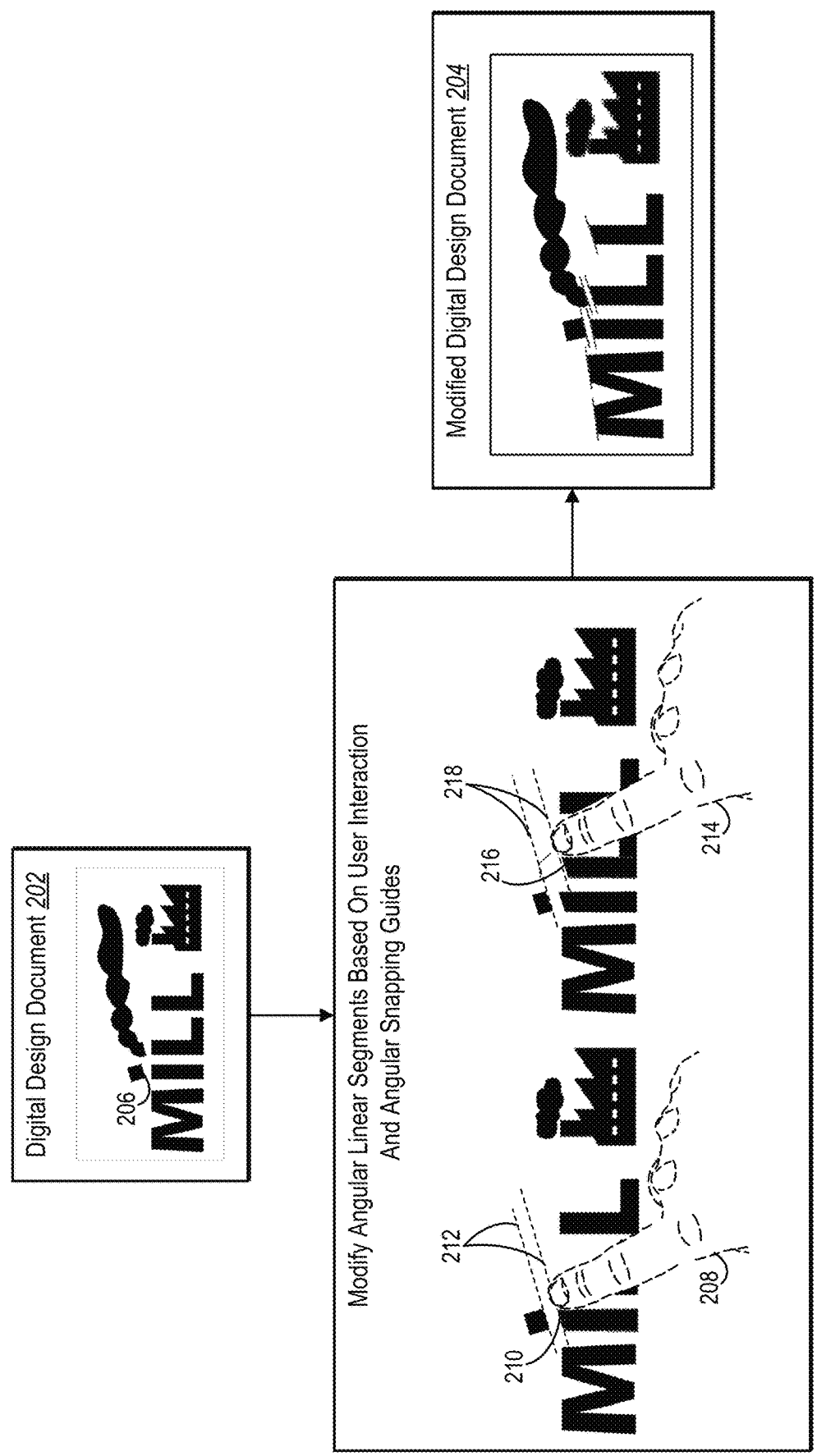
FIG. 2 illustrates a diagram of generating angular snapping guides and snapping angular linear segments in accordance with one or more embodiments.

As discussed above, in one or more embodiments, the design guide system 112 generates modified digital design documents based on user interaction with one or more angular snapping guides. FIG. 2 illustrates an overview of the process for modifying a digital design document utilizing angular snapping guides.

More specifically, FIG. 2 illustrates a digital design document 202 including stylized letters spelling "mill." As shown in FIG. 2, the digital design document 202 includes an offset dot on the "i" in "mill" that has a target angular linear segment 206. As also shown in FIG. 2, the design guide system 112 receives user input at the digital design document 202 to align other angular linear segments to the rotated alignment of the target angular linear segment 206 and generate the modified digital design document 204. In particular, as shown in FIG. 2, in response to receiving user input at the digital design document, the design guide system 112 provides angular snapping guides to align subject linear angular segments with the target angular linear segment 206.

For example, the design guide system 112 identifies a user interaction 208 indicating a rotation of a subject angular linear segment 210. When the user interaction 208 comes within a snapping tolerance of making the subject angular linear segment 210 parallel to the target angular linear segment 206, the design guide system 112 generates the angular snapping guide 212 and aligns the subject linear segment 210 to the angular snapping guide 212. As shown, the angular snapping guide 212 includes a visual representation that indicates a rotation of the subject angular linear segment 210 as well as the angular alignment of the target angular linear segment 206. Moreover, as illustrated, snapping the subject angular linear segment 210 to the angular snapping guide 212 makes the subject linear segment 210 parallel to the target angular linear segment 206.

Similarly, the design guide system 112 identifies a user interaction 212 with a subject angular linear segment 216. Based on the user interaction 212 coming within a snapping tolerance of the target angular linear segment 206, the design guide system 112 generates the angular snapping guide 218 and snaps the subject angular linear segment 216 to the angular snapping guide 218. The design guide system 112 can iteratively identify user interactions and generate additional angular snapping guides to assist in aligning various subject angular linear segments to one or more target angular linear segments. In this manner, the design guide system 112 efficiently and accurately generates the modified digital design document 204.

Indeed, as shown in the modified digital design document 204 of FIG. 2, the design guide system 112 modifies subject angular linear segments at the tops of the letters "M," "I," "L," and "L" so that they are all precisely aligned and parallel. The design guide system 112 can accomplish this result quickly and efficiently. Indeed, based on a user selection and movement coming within a threshold snapping tolerance, the design guide system 112 automatically snaps the user interaction to angular snapping guides so that the transformations automatically align. Accordingly, in a few straight-forward user interactions, the design guide system 112 generates the modified digital design document 204.

This is a significant improvement relative to conventional systems. As discussed above, in conventional system the process of aligning these segments would be inaccurate and inefficient. Indeed, it would take numerous attempts to try and align the subject angular linear segments near the correct alignment. After these attempts, the shapes would typically still not be precisely aligned, but would each have a slightly skewed angle.

Figure 3:
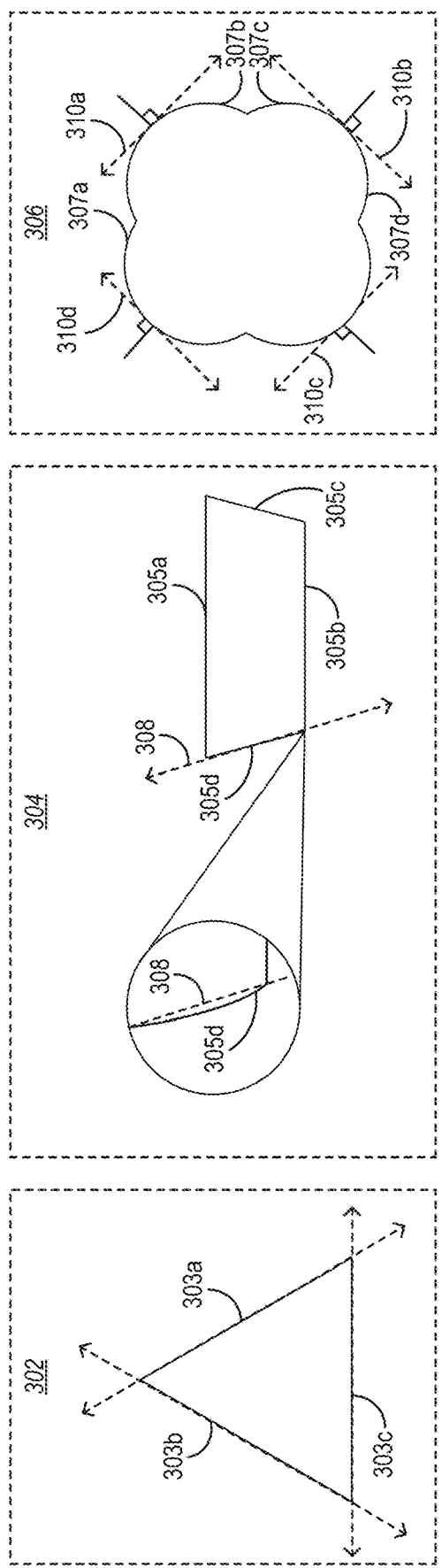
FIG. 3 illustrates a drawing showing snappable locations for a variety of digital design objects in accordance with one or more embodiments.

As mentioned above, in one or more embodiments the design guide system 112 generates angular snapping can extract and analyze a variety of angular linear segments in generating angular snapping guides. FIG. 3 illustrates example angular linear segments and corresponding example angular snapping guides, including slightly curved paths and tangential line segments.

For example, FIG. 3 illustrates a digital design object 302 made of linear vector paths. More specifically, as shown in FIG. 3, the digital design object 302 is a triangle made up of perfect angular linear segments 303*a*-303*c*. In one or more embodiments, the design guide system 112 determines snappable locations corresponding to the perfect linear angular linear segments 303*a*-303*c* (e.g., extending out from the segments). For example, the design guide system can rotate subject angular linear segments so that they are parallel to these segments or translate subject angular linear segments so that they are nearly colinear to these segments.

Additionally, FIG. 3 illustrates a digital design object 304 made up of slightly curved paths 305*a*-305*d*. More specifically, as shown in FIG. 3, the digital design object 304 is a trapezoid including a slightly curved segment 305*d*. As shown in FIG. 3, the design guide system 112 can approximate a straight line for the slightly curved segment 305*d* and extract an angular linear segment 308. Further, in one or more embodiments, the design guide system 112 generates snappable locations based on the angular linear segment 308.

More specifically, in one or more embodiments, the design guide system 112 determines that the curve of an angular linear segment is below a threshold curvature. In response to determining that a slightly curved angular linear segment satisfies the threshold curvature, the design guide system 112 can generate a straight line approximating the slope of the slightly curved angular linear segment. For example, the design guide system 112 can generate a straight line approximation by connecting endpoints of the curved segment (or by utilizing a line tangential to the center of the curve or by identifying an average orientation of the curve).

Thus, in one or more embodiments, the design guide system 112 generates snappable locations extending from and/or parallel to the approximated straight line.

FIG. 3 also illustrates a digital design object 306 with curved segments. More specifically, FIG. 3 illustrates a flower-shaped digital design object 306 including four curved segments 307a-307d. As shown in FIG. 3, the design guide system 112 extracts angular linear segments 310a-310d by determining an angle tangential to the corresponding curved segments 307a-307d.

More specifically, as shown, the design guide system 112 generates a line segment 310a with a slope tangential to the curved angular linear segment 307a. In one or more embodiments, the design guide system 112 utilizes this tangential line segment as an angular linear segment in determining snappable locations corresponding to the curved segment. More specifically, in one or more embodiments, the design guide system 112 determines snappable locations extending out from (and/or parallel to) the tangential line segment. Further, in one or more embodiments, the design guide system 112 utilizes the tangential line segment to determine collinearity for presentation of an angular snapping guide, as discussed in greater detail below.

Figure 4:
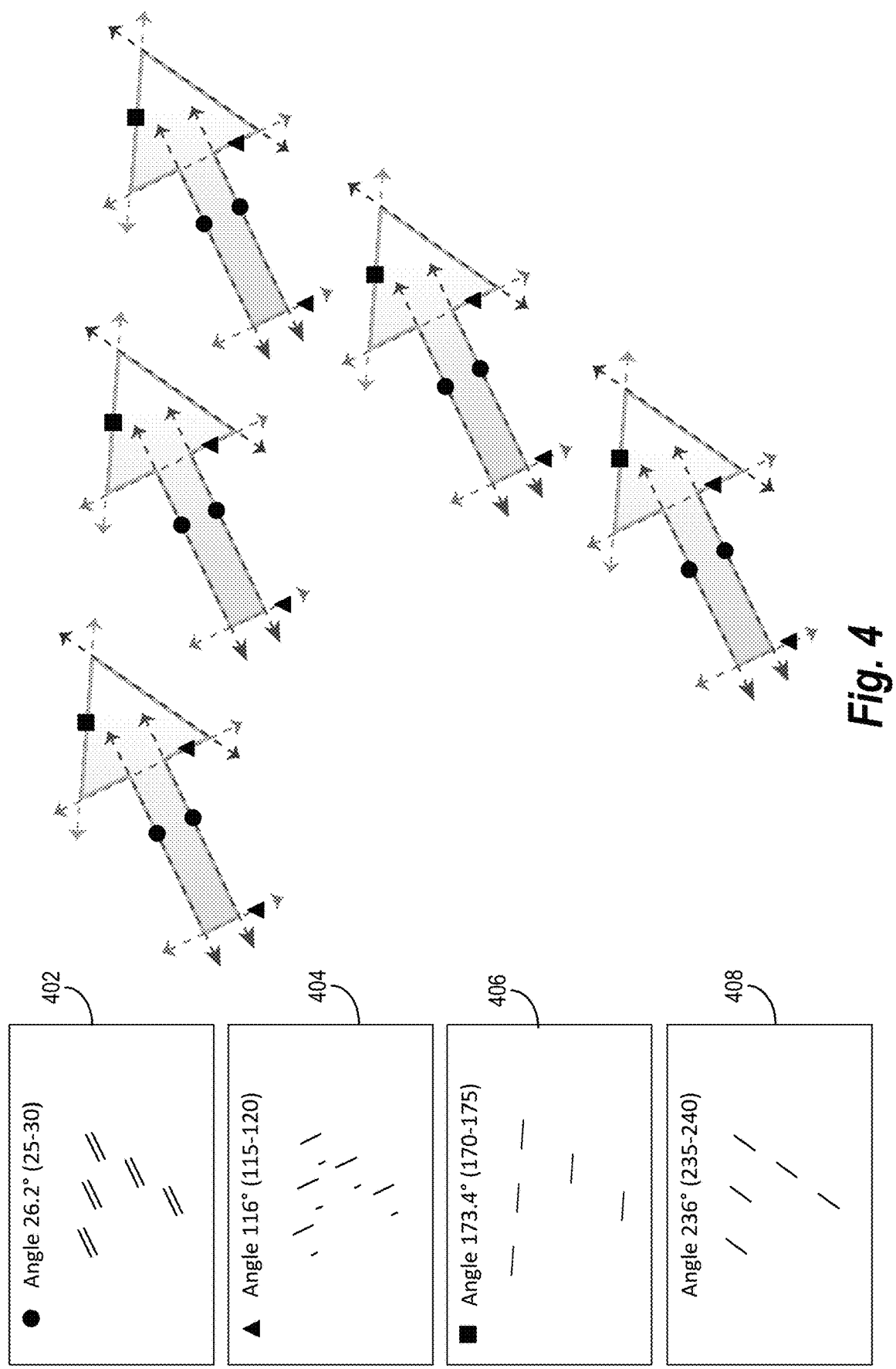
FIG. 4 illustrates a drawing of mapping angular linear segments into angular bins with one or more embodiments.

As discussed above, in one or more embodiments, the design guide system 112 generates angular bins and assigns angular linear segments to angular bins. Moreover, in one or more embodiments, the design guide system 112 searches an angular bin for a target angular linear segment rather than searching every angular linear segment in a digital design document. FIG. 4 illustrates generating angular bins from angular linear segments in a digital design document in accordance with one or more embodiments. In particular, FIG. 4 illustrates generating angular bins 402-408 corresponding to angular linear segments from arrow-shaped digital design objects.

As shown in FIG. 4, angular linear segments in the angular bin 402 having a representative angle of 26.2 degrees are illustrated with a circle icon. The angular linear segments in the angular bin 404 having a representative angle of 116 degrees are illustrated with a triangle icon. Additionally, angular linear segments in the angular bin 406 having a representative angle of 173.4 degrees are illustrated with a circle icon. Also, the angular linear segments in the angular bin 408 having a representative angle of 236 degrees are illustrated with no icon.

In one or more embodiments, the design guide system 112 determines a total number of angular bins based on a snapping tolerance. For example, in some embodiments, the design guide system 112 determines a number of angular bins for a digital design document based on the snapping tolerance for the digital design document relative to the slopes of angular linear segments in the digital design document. In particular, the design guide system 112 can divide an angular space value (e.g., the range of angles corresponding to segments in the digital design document or a different range such as 180) by the snapping tolerance. To illustrate, given a snapping tolerance of 5 degrees and an angle space value of 180, the design guide system 112 can generate 16 angular bins. Moreover, the design guide system can determine an angular range corresponding to each angular bin (e.g., 0 to 5 degrees, 5 to 10 degrees, 10 to 15 degrees, etc.). In some embodiments, the design guide system also determines a bin number corresponding to each bin (e.g., 0 to 5 degrees corresponds to bin 0 and 5 to 10 degrees corresponds to bin 1).

For example, in FIG. 4, the design guide system 112 generates 48 angular bins having angular ranges spanning 5 degrees each. However, many angular bins are empty, having no angular linear segments with slopes within the range. As shown in FIG. 4, the angular bin 402 has an angular range of 25-30 degrees, the angular bin 404 has an angular range of 115-120 degrees, the angular bin 406 has an angular range of 170-175 degrees, and the angular bin 408 has an angular range of 235-240 degrees.

The design guide system 112 can then assign angular linear segments to the angular bins. In particular, the design guide system 112 can compare the angular range (e.g., the bin number) corresponding to each angular bin to the angle of each angular linear segment in a digital design document. For example, in some embodiments, the design guide system 112 compares the angles and assigns the angular linear segment to a particular bin by utilizing a key function that converts the angle to a bin number. To illustrate, the key function can divide the angle value of the angular linear segment by the snapping tolerance. The resulting integer can reflect a bin number for an assigned angular bin. For example, if an angular linear segment has an angle of 12, and the snapping tolerance is 5, the resulting bin number is 2 (e.g., the integer portion of 12/5 is 2). The design guide system 112 can then insert the angular linear segment in bin 2 (corresponding to an angular range of 10-15).

In addition, as mentioned above, the design guide system 112 can also arrange the angular linear segments within each angular bin based on a signed distance. For example, the design guide system 112 can order the angular linear segments based on their signed distance relative to the origin of the digital design document. Thus, for example, the design guide system 112 can arrange angular linear segments in ascending or descending order based on signed distance. Thus, if the origin of the digital design document is in the bottom left corner of FIG. 4, the digital design document could arrange the angular linear segments within each of the bins 402-408 based on the signed distance of each angular linear segment relative to the bottom left corner. Additional detail regarding determining signed distance is provided below (e.g., in relation to FIG.

In one or more embodiments, the design guide system 112 utilizes the following computer-implemented algorithm to create and sort angular bins:

---
Algorithm 1 Creation of Angular Bin
---

Require: snapping tolerance th, list of snappable location Σ
procedureKEY(val)
   key ← val/th
   return integer part of key; Bin number based on snapping tolerance
procedureINSERTION(l,B)
   m ← slope of l
   θ ← KEY(m)
   Add l in B[θ]
B is AngularBinMap with value being list of location whose slope lies in that bin.
foreachl$_i$ inΣdo
   INSERTION(l$_i$, B)
   for each angle θ in B do
      σ ← B[θ]; B[θ] may be denoted as B$_θ$
      sort σ based on signed distance of location.

---

For the same signed distance of location, ordering is done based on the projection of starting point of location on y axis.

As just mentioned, in one or more embodiments, the design guide system 112 can determine a signed distance for angular linear segments. Indeed, in one or more embodiments, the design guide system 112 sorts angular linear segments within angular bins based on signed distance from a reference point (e.g. the origin) within the digital design document. Accordingly, the design guide system 112 can efficiently search within an angular bin for a target angular linear segment based on a signed distance of a subject angular linear segment.

Figure 5:
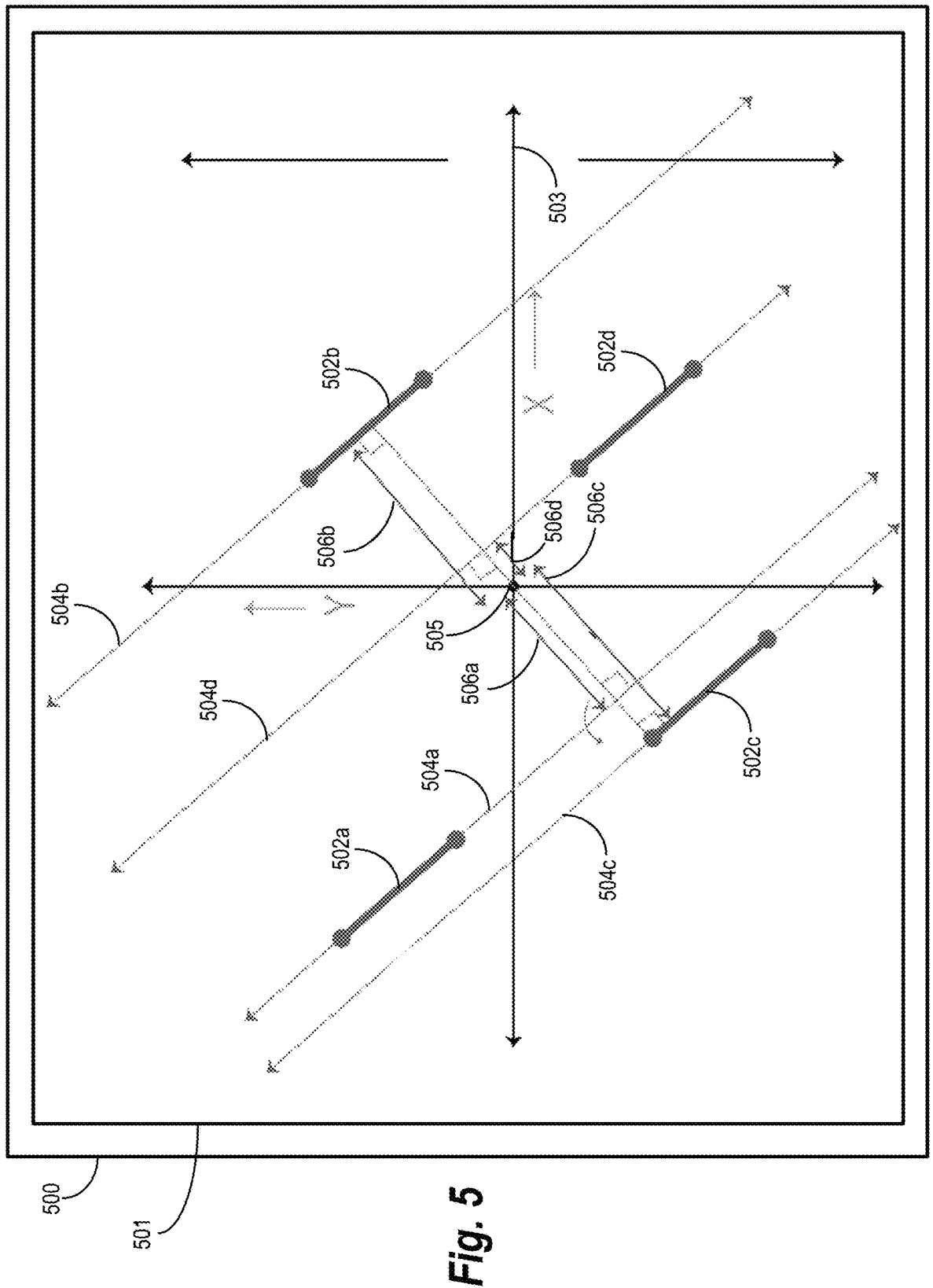
FIG. 5 illustrates a drawing of snappable locations in a digital design document in accordance with one or more embodiments.

FIG. 5 illustrates determining signed distance of various angular linear segments in accordance with one or more embodiments. In particular, FIG. 5 illustrates a client device 500 displaying a digital design document 501 including an axis 503. As shown in FIG. 5, the digital design document 501 includes angular linear segments 502*a*-502*d*. Further, FIG. 5 illustrates the design guide system 112 determining signed distances 506*a*-506*d* from an origin 505 of the digital design document.

As shown in FIG. 5, the design guide system 112 determines signed distance by determining the smallest distance between an extension of the angular linear segment and the origin. Thus, as illustrated in FIG. 5, the design guide system 112 extends the angular linear segment 502*a*-502*d*, generating the extended angular linear segments 504*a*-504*d*. Further, in one or more embodiments, the design guide system 112 determines the smallest perpendicular distance between the extended angular linear segments 504*a*-504*d* and the origin. Thus, the design guide system 112 can determine a positive or negative signed distance in relation to the origin in the digital design document.

For example, as shown in FIG. 5, the design guide system 112 analyzes the extended angular linear segment 504*a* to determine the signed distance 506*a* perpendicular to the angular linear segment 502*a*. Similarly, as shown in FIG. 5, the design guide system 112 analyzes the extended angular linear segments 504*b*-504*c* to determine the signed distances 506*b*-506*c* perpendicular to the angular linear segments 502*b*-502*c*. As also shown in FIG. 5, the design guide system 112 projects a point onto the angular linear segment 502*b* to determine the signed distance 506*b* perpendicular to the angular linear segment 502*b*. Thus, the design guide system 112 can determine the signed distance for any angular linear segment at any position and slope relative to the digital design document 501.

Although FIG. 5 illustrates using the origin 505 to determine the signed distance, in other embodiments the design guide system 112 utilizes a different reference point. For example, the origin of a digital design document may actually lie a large distance from the angular linear segments 502*a*-502*c*. Such circumstances can result in large signed distances between the digital design objects (e.g., each signed distance to the origin is large and the relative signed distance between the digital design objects is large), even though the digital design objects are relatively close together. Having large signed distances can create complications in applying snapping tolerances or other thresholds because the signed distance may not accurately reflect the actual distances relative to the selected thresholds. Accordingly, in some embodiments, the design guide system 112 can modify the location of the reference point so that it is closer to the digital design objects. For example, in some embodiments, the design guide system 112 selects a position for reference point (e.g., within a threshold distance of one or more digital design objects, based on a centroid of digital design objects, or based on some other distance metric). The design guide system 112 can then utilize selected referenced point for determining the signed distance.

In one or more embodiments, rather than modifying the reference point from the origin, the design guide system 112 can determine snapping metrics and other thresholds relative to the position of the origin. Thus, if the origin is further away from the digital design objects, the design guide system 112 can select larger thresholds.

Further, in some embodiments, in the event of an identical signed distance, the design guide system 112 determines a distance based on a value of a projection of a starting point of the angular linear segment on the y-axis (or x-axis) of the digital design document. To illustrate, in one or more embodiments, the design guide system 112 identifies an endpoint of an angular linear segment closest to the y-axis of a digital design document. Further, in some embodiments, the design guide system 112 projects a point horizontally from the end point onto the y-axis. Accordingly, in one or more embodiments, the design guide system 112 determines a distance between the endpoint and the projected point.

Though FIG. 5 illustrates determining the signed distanced 504*a*-504*d* in a particular way, it will be appreciated that in one or more embodiments, the design guide system 112 utilizes a variety of signed distance functions to determine signed distanced. For example, the design guide system 112 can utilize an oriented distance function, a non-oriented signed distance function, a fast marching method, a fast sweeping method and/or a level-set method. Thus, in one or more embodiments, the design guide system 112 utilizes a variety of signed distance functions to determine a signed distance relative to the reference point in the digital design document.

Figure 6A:
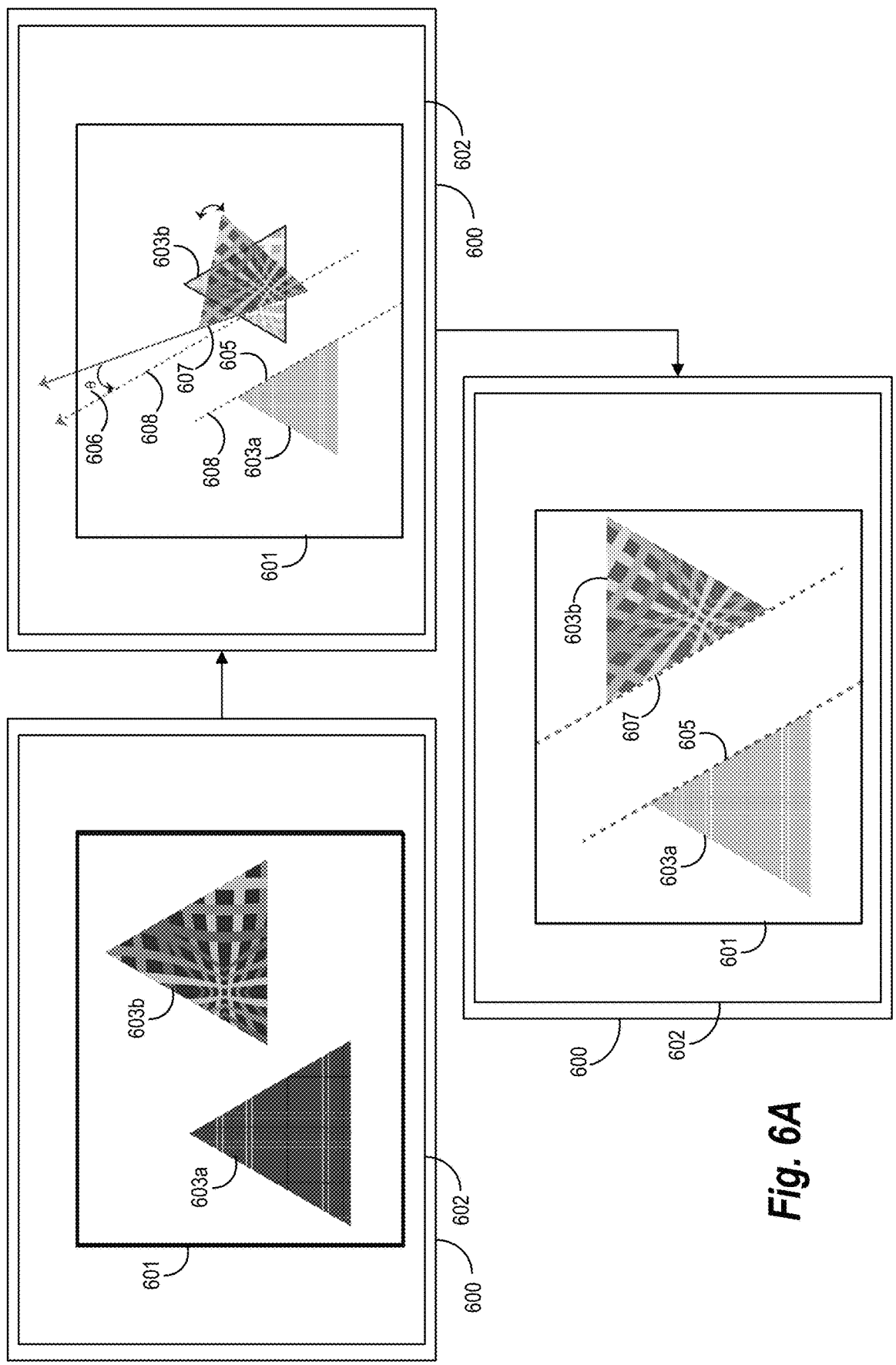
FIGS. 6A-6B illustrate a drawing of snapping an angular linear segment to an angular snapping guide during rotation in accordance with one or more embodiments.
Figure 6B:
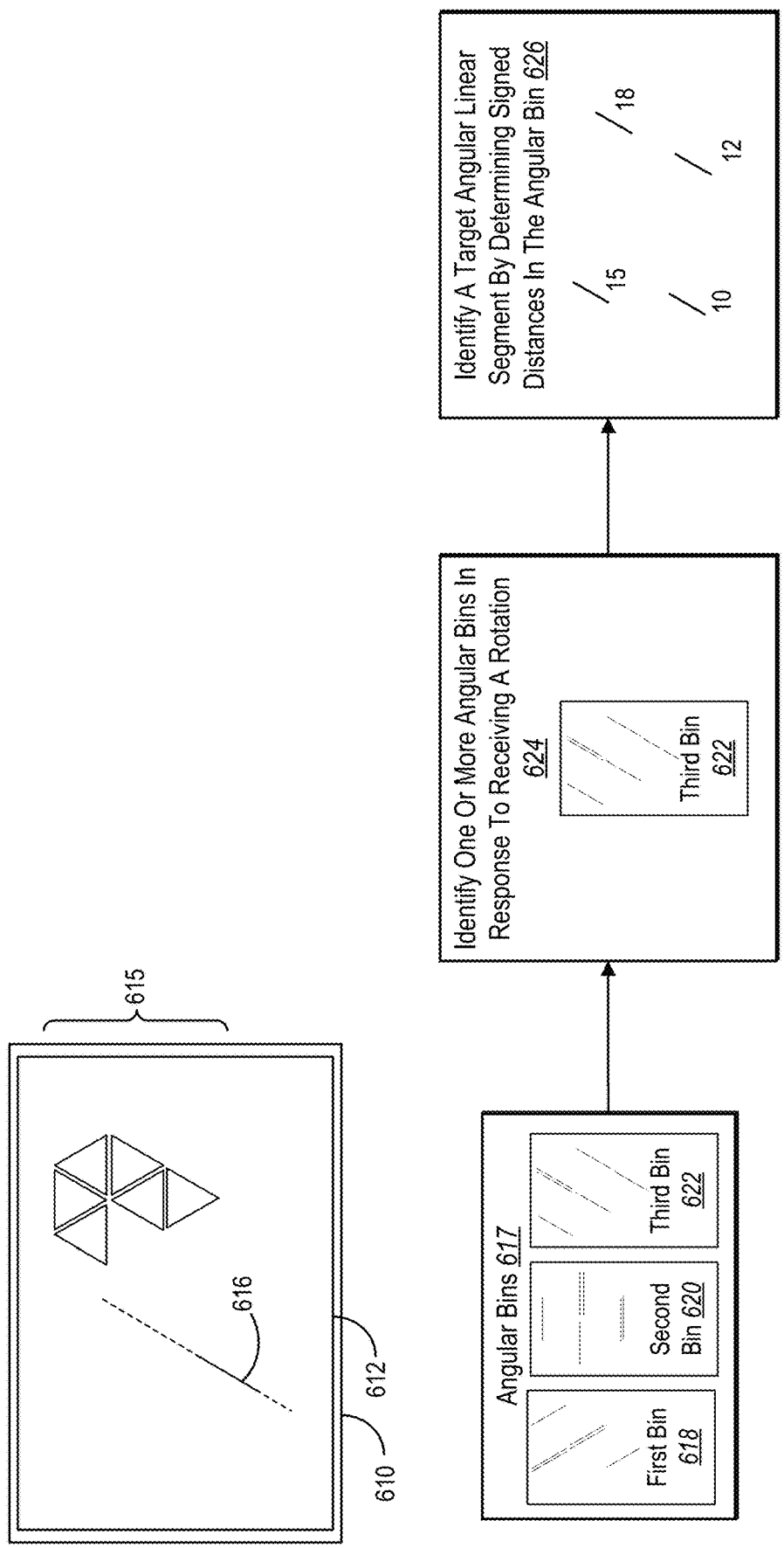

As mentioned above, the design guide system 112 provides angular snapping guides and modifies digital design documents based on a variety of user interactions with angular snapping guides. FIGS. 6A-6B illustrate a process for modifying a digital design document based on receiving a rotation of a digital design object interacting with an angular snapping guide. More specifically, FIG. 6A illustrates an overview of providing an angular snapping guide in response to a received rotation.

More specifically, FIG. 6A illustrates a computing device 600 displaying a graphical user interface 602 including a digital design document 601. Further, the digital design document 601 includes the digital design objects 603*a*-603*b*. As shown in FIG. 6A, the design guide system 112 receives user interaction rotating the digital design object 603*b*. More specifically, the design guide system 112 receives user interaction rotating the digital design object 603*b* within an angular snapping tolerance 606 of a target angular linear segment 605 (e.g., a snappable location) corresponding to an angular snapping guide 608.

In one or more embodiments, the design guide system 112 receives user interaction rotating the digital design object 603*b* such that a subject angular linear segment 607 of the digital design object 603*b* is within an angular snapping tolerance of the target angular linear segment 605 and the angular snapping guide 608. Thus, in response to the received user interaction, the design guide system 112 provides a visual representation of the angular snapping guide 608. Further, in response to the received user interaction, the design guide system 112 snaps the subject angular linear segment 607 (and the corresponding digital design object 603*b*) onto the angular snapping guide 608.

In one or more embodiments, the design guide system 112 generates the angular snapping guide 608 based on the target angular linear segment 605. To illustrate, the design guide system 112 generates the angular snapping guide 608 such that by snapping the digital design object 603*b* to the angular snapping guide 608, the design guide system 112 is aligned to (e.g., parallel to) the target angular linear segment 605. Thus, in one or more embodiments, the design guide system 112 generates the angular snapping guide 608 parallel to the target angular linear segment 605 at the digital design object 603b.

Additionally, as shown in FIG. 6A, the design guide system 112 visual indication of the angular snapping guide 608 can include an indication at the target segment 605. In one or more embodiments, the angular snapping guide 608 includes a visual representation of the target angular linear segment in addition to a visual representation of a snappable location corresponding to the target angular linear segment. For example, as shown in FIG. 6A, the design guide system 112 extends the target angular linear segment 605 with a dashed line. In addition or in the alternative, the design guide system 112 can modify the visualization of the angular linear segment in color, boldness, etc. to illustrate its use in the transformation.

Thus, as shown in FIG. 6A, the design guide system 112 aligns the subject angular linear segment 607 corresponding to the digital design object 603b based on the slope of a target angular linear segment 605 of the digital design object 603a. Accordingly, the design guide system 112 aligns the digital design objects at a non-vertical and non-horizontal angle. However, as discussed above, providing an angular snapping guide by comparing slopes of each angular linear segment in a digital design document can be inefficient and require excessive computational resources. FIG. 6B illustrates the design guide system 112 utilizing angular bins to efficiently determine that a subject angular linear segment is within an angular snapping tolerance of a snappable location corresponding to another angular linear segment.

More specifically, FIG. 6B illustrates a computing device 610 presenting a digital design document 612 including digital design objects 615 and a subject angular linear segment 616. As shown in FIG. 6B, the angular linear segment 616 is a line segment and the digital design objects 615 include six triangles. The design guide system 112 receives user input rotating the subject angular linear segment 616.

FIG. 6B illustrates that the design guide system 112 organizes the angular linear segment 616 and the angular linear segments of the digital design objects 615 into the angular bins 617. More specifically, as described above with reference to FIG. 4, the design guide system 112 assigned a first set of angular linear segments into a first bin 618, a second set of angular linear segments into a second bin 620, and a third set of angular linear segments into a third bin 622. As shown in FIG. 6B, the design guide system 112 assigns the angular linear segments to the angular bins based on their slope in the digital design document and the corresponding angular ranges of the angular bins.

As mentioned, the design guide system 112 receives user input rotating the subject angular linear segment 616. As shown in FIG. 6B, in one or more embodiments, the design guide system 112 performs an act 624 of identifying one or more angular bins in response to receiving a rotation. More specifically, in one or more embodiments, the design guide system 112 utilizes the slope of the subject angular linear segment 616 to identify a target angular bin. To illustrate, the design guide system 112 identifies a target angular bin with an angular range that is closest (e.g., that includes) the slope of the subject angular linear segment.

For example, as described above, the design guide system 112 can utilize a key function to convert the slope/angle of the subject angular linear segment to a particular target angular bin. To illustrate, the key function can divide the angle by the snapping tolerance and use the resulting integer to identify a bin number. The design guide system 112 can compare the angular ranges of the bins and the slope of the subject angular linear segment in a variety of ways.

As mentioned above, in one or more embodiments, the design guide system 112 determines multiple target angular bins. Indeed, a subject angular linear segment may fall within a snapping tolerance of one or more surrounding angular bins. Thus, in one or more embodiments, the design guide system 112 determines selects a first target angular bin (that encompasses the angle of the subject angular linear segment) and then adds surrounding target angular bins (e.g., a second target angular bin above the first target angular bin and a third target angular bin below the first target angular bin). In other words, in some embodiments, the design guide system 112 determines a center angular bin, an upper angular bin, and a lower angular bin corresponding to the upper and lower bound of an angular range. For example, in one or more embodiments, the design guide system 112 utilizes the angle plus a snapping tolerance and the angle minus the snapping tolerance to determine the angular range. Then the design guide system 112 utilizes the angular range to select the upper, center, and lower angular bins. Further, in one or more embodiments, the design guide system 112 identifies and analyzes angular linear segments from each of the three angular bins.

In one or more embodiments, in response to determining the one or more target angular bins, the design guide system 112 identifies a target angular linear segment from within the one or more target angular bins. To illustrate, as shown in FIG. 6B, the design guide system 112 performs an act 626 of identifying a target angular linear segment by determining signed distances in the one or more target angular bins. As shown in FIG. 6B, the design guide system 112 searches the third bin 622 for the target angular linear segment. As discussed above, in one or more embodiments, the design guide system 112 organizes angular bins based on signed distance (e.g., 15, 18, 10, and 12 illustrated in FIG. 6B). Accordingly, the design guide system 112 efficiently determines an angular linear segment in the target angular bin having the most similar signed distance to the subject angular linear segment 616.

In one or more embodiments, the design guide system 112 analyzes the target angular bins to determine an angular linear segment with a minimum angular distance from the subject angular linear segment. Additionally, in some embodiments, the design guide system 112 utilizes signed distance as a tiebreaker by identifying a target angular linear segment having the lowest signed distance from the subject angular linear segment among candidate angular linear segments having a minimum angular distance. Further, in some embodiments, the design guide system 112 determines a difference in angles between the target angular linear segment and rotates the subject angular linear segment based on the determined difference.

In one or more embodiments, the design guide system 112 utilizes the following computer-implemented algorithm to snap an angular linear segment onto an angular snapping guide during a rotation:

Algorithm 2 Angular Rotation Snapping

Figure 7A:
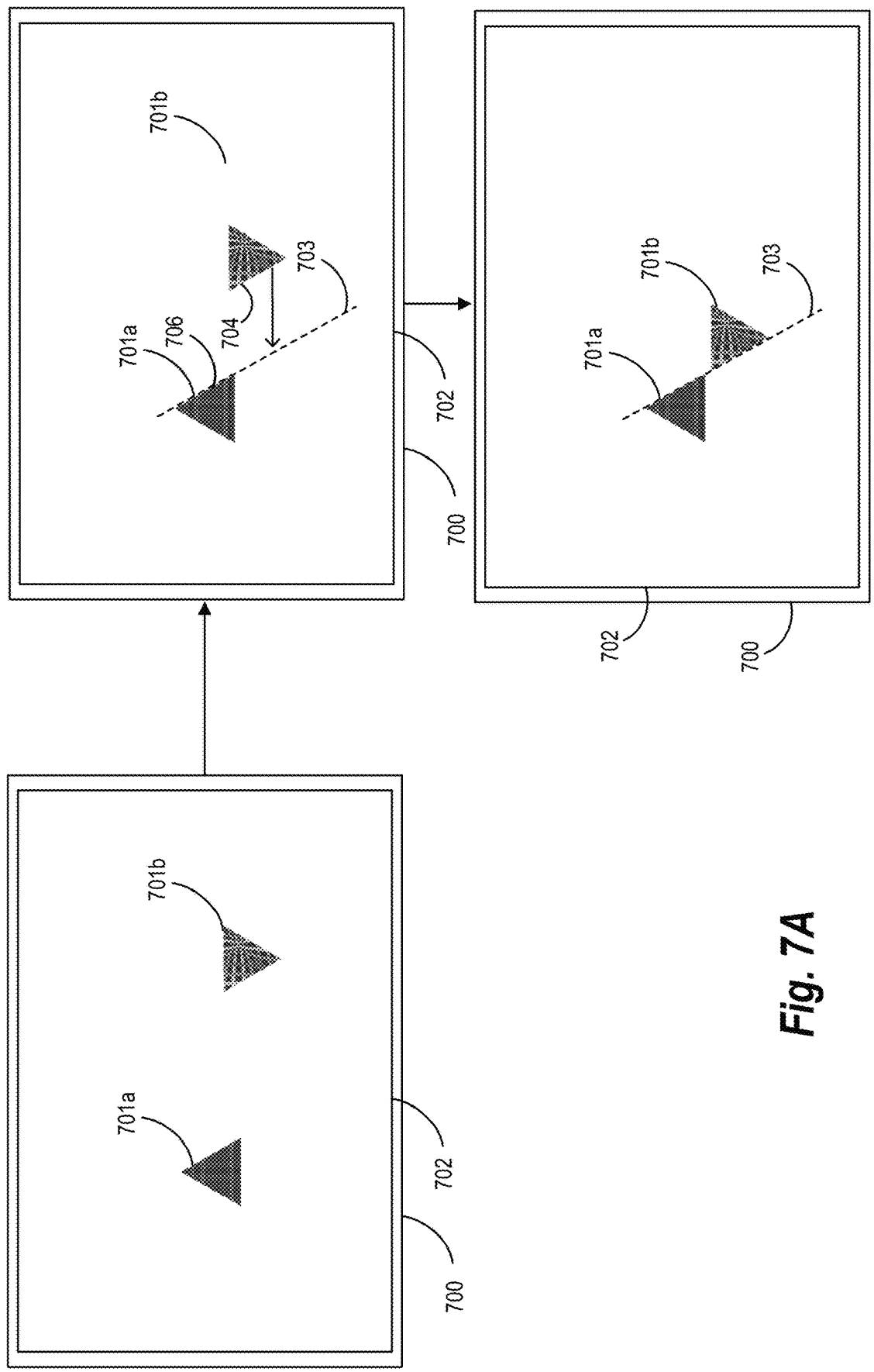
FIGS. 7A-7C illustrate a drawing of snapping an angular linear segment to an angular snapping guide during translation in accordance with one or more embodiments.
Figure 7B:
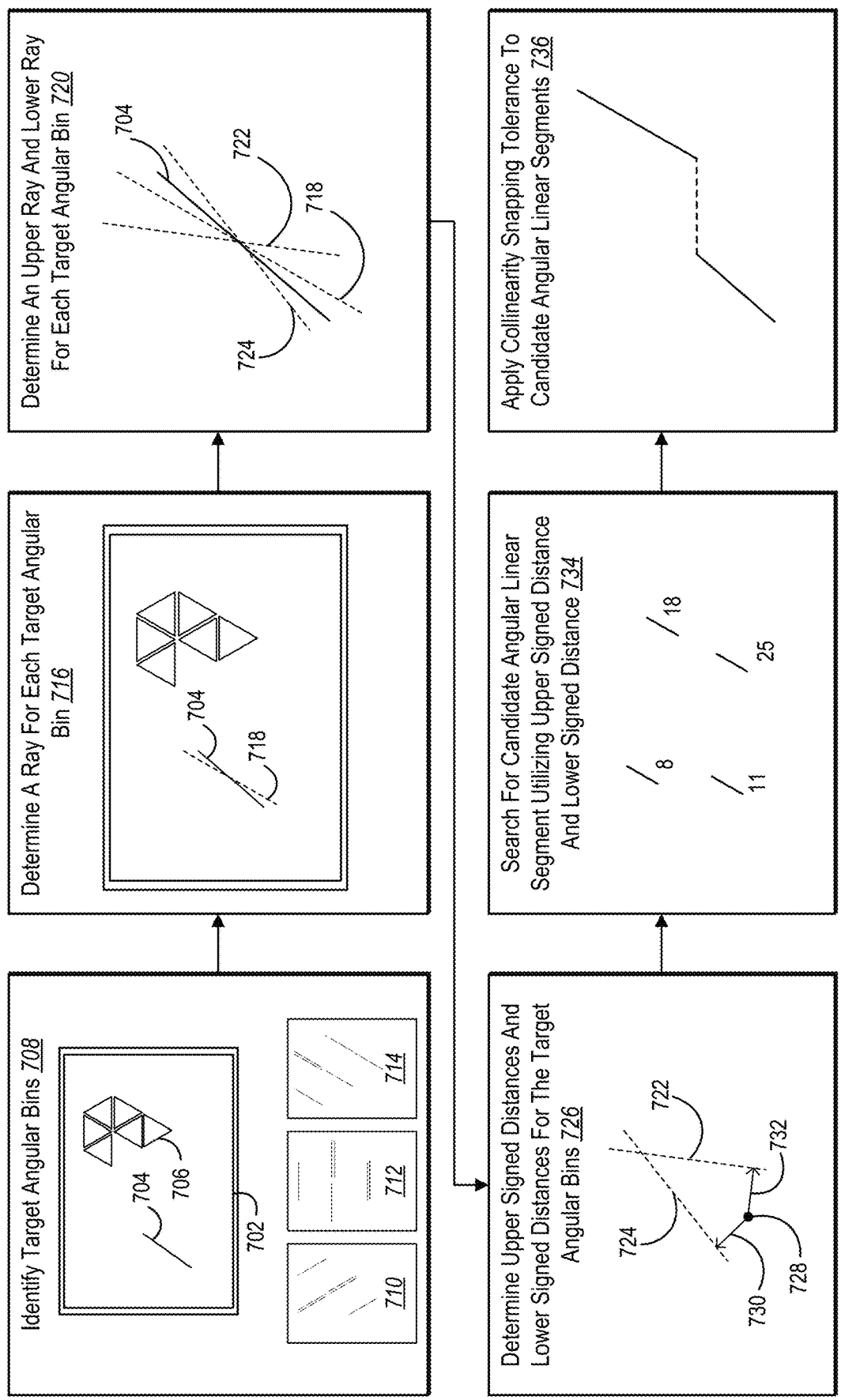
Figure 7C:
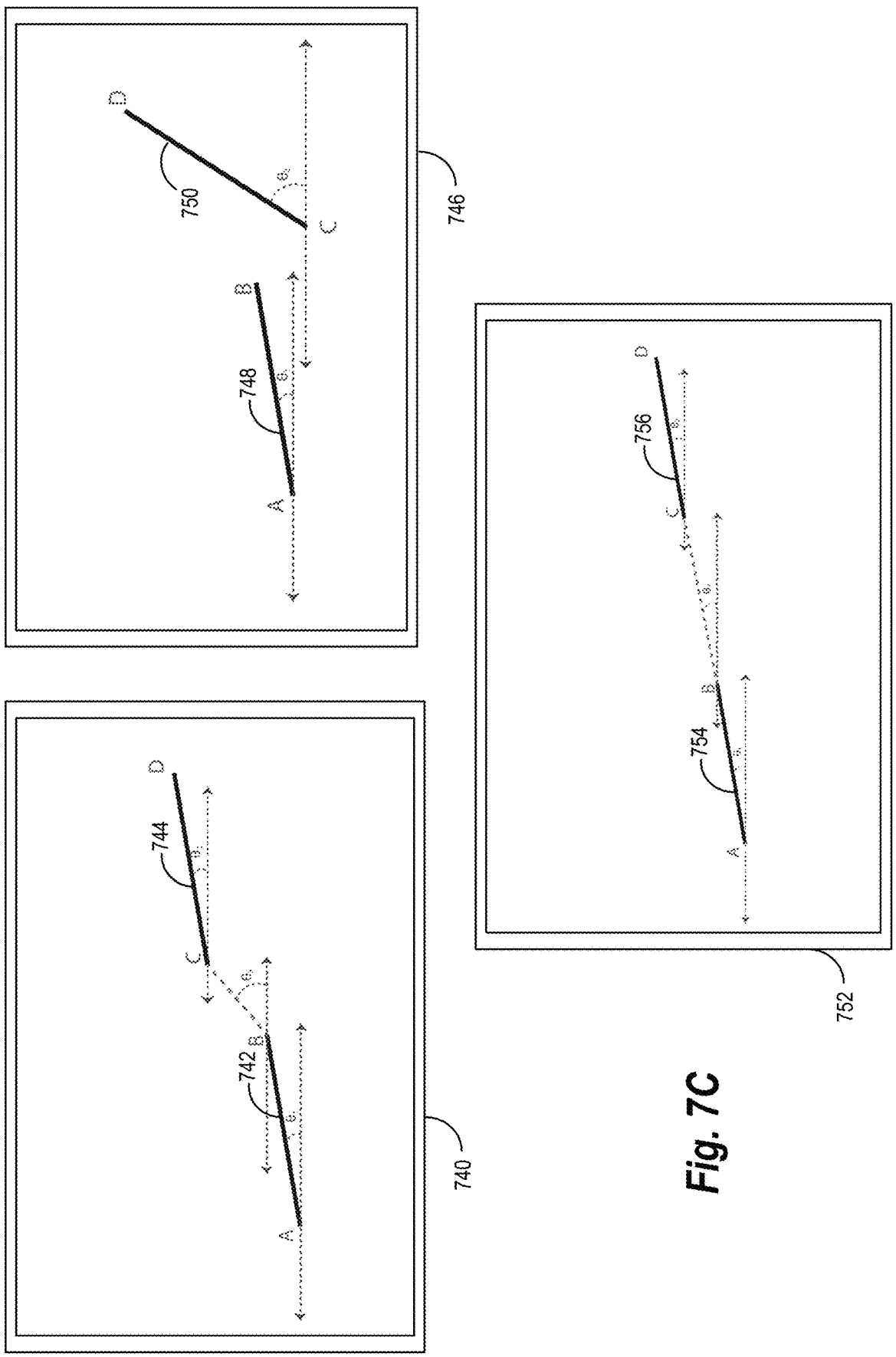

Require: Input Subject, which is transformed S; Angular Bin Map B; snapping tolerance ε
procedureDISTANCE($l_1,l_2$) - determines distance between two parallel locations
   $d_1$ ← signed distance of $l_1$
   $d_2$ ← signed distance of $l_2$
   return |$d_1 - d_2$|
procedurePARALLELLOCATION($s_i$,B,ε) - evaluates all possible candidate locations
   θ ← angle of $s_i$
   k ← KEY(θ)
   k+ ← KEY(θ+ε)
   k- ← KEY(θ-ε)
   P ← location in B which matches k, k+, k-, merged on the basis on distance.
   return P
procedureWINNINGROTCANDIDATE(s,B,ε) - determines Best possible input and target
candidate location
   θ ← angle of s
   P ← PARALLELLOCATION(s, B, ε)
   P ← all location in P with minimum angular deflection compare to θ
   for each $l_j$ in P do
     find j with minimum DISTANCE($l_j$, s)
     return $l_j$
RotationSnappingStarts.
   σ ← snappable location in S for each $s_i$ in S do
     $l_i$ ← WINNINGROTCANDIDATE($s_i$, B, ε)
     find i with minimum DISTANCE($l_i$, $s_i$)
     δ←$θ_{l_i}$-$θ_{s_i}$ Adjust δ with global reference point.
     Apply rotation, and draw hinting at $s_i$ and $l_i$ As discussed above, in one or more embodiments, the design guide system 112 generates modified digital design documents by snapping angular linear segments onto angular snapping guides during translation. For example, FIGS. 7A-7C illustrate identifying a target angular linear segment for presentation of an angular snapping guide during translation within a digital design document in accordance with one or more embodiments. More specifically, FIG. 7A illustrates a client device 700 including a digital design document 702. Further, the digital design document 702 includes digital design objects 701a-701b.

As shown in FIG. 7A, the design guide system 112 receives user input translating the digital design object 701b toward the digital design object 701a. In response to receiving user input within a tolerance (e.g., within a collinearity snapping tolerance) of a snappable location corresponding to the digital design object 701a, the design guide system 112 provides the angular snapping guide 703. More specifically, as shown in FIG. 7A, the design guide system 112 determines that a subject angular linear segment 704 is within a collinearity snapping tolerance of the target angular linear segment 705. In response, the design guide system 112 provides the angular snapping guide 703 by providing a dashed line extending out from the digital design object 701a. In addition, the design guide system 112 translates and rotates the digital design object 701b so that the subject angular linear segment 704 is parallel with the target linear segment 706 and translates the digital design object 701b so that the subject angular linear segment 704 is on the same linear plane as the target linear segment 706.

As just mentioned, in one or more embodiments, the design guide system 112 determines that a subject angular linear segment is within a snapping tolerance of an angular snapping guide by determining that the subject angular linear segment and the angular snapping guide are nearly collinear. To illustrate, in one or more embodiments, the design guide system 112 determines that an angular snapping guide and a subject angular linear segment are close to parallel and nearly along the same linear plane within a digital design document. However, this near collinearity introduces search complexities in that the subject linear segment 704 and the target linear segment 706 are neither parallel nor along the same linear plane. Accordingly, the design guide system 112 utilizes a collinearity snapping tolerance together with angular bins and upper and lower bound constraints to efficiently search for candidate linear segments that are nearly parallel with the subject linear segment and nearly on the same plane as the subject linear segment. Additional detail regarding identifying nearly collinear target angular linear segments is provided below (e.g., in relation to FIGS. 7B-7C).

As shown in FIG. 7A, in response, to determining that this collinearity snapping tolerance has been satisfied, the design guide system 112 generates the angular snapping guide 703. Additionally, as shown in FIG. 7A, the design guide system 112 modifies the digital design document 702 based on the user interaction with the angular snapping guide. Specifically, the design guide system 112 translates and rotates the digital design object 701b so that the subject angular linear segment 704 is parallel to and colinear with the target angular linear segment 706.

FIG. 7B illustrates additional detail of a process for identifying candidate angular linear segments during translation of a subject digital design object. More specifically, FIG. 7B illustrates a sequence of acts for generating an angular snapping guide utilizing a collinearity snapping tolerance in accordance with one or more embodiments.

For example, FIG. 7B illustrates that the design guide system 112 performs an act 708 of identifying target angular bins for a subject angular linear segment. In particular, FIG. 7B illustrates a computing device with a digital design document 702 having an angular linear segment 704 and digital design objects 706. As described in greater detail above, the design guide system 112 assigns a first set of angular linear segments into a first bin 710, a second set of angular linear segments into a second bin 712, and a third set of angular linear segments into a third bin 714. As shown in FIG. 7B, the design guide system 112 bins the angular linear segment based on slope of the angular linear segments within the digital design document 702.

Moreover, the design guide system 112 determines one or more target angular bins corresponding to the subject angular linear segment 704. For example, as described above, the design guide system 112 can determine a target angular bin with an angular range that includes the angle of the subject angular linear segment 704. In some embodiments, the design guide system 112 utilizes the key algorithm described previously to identify a bin number corresponding to the subject angular linear segment 704.

In addition, the design guide system 112 can identify an upper target angular bin and a lower target angular bin (e.g., bins surrounding a central target angular bin). As described above, the design guide system 112 can determine a central target angular bin having an angular range that includes the angle of the subject angular linear segment 704. The design guide system 112 can determine an upper target angular bin by adding the snapping tolerance to the angle of the subject angular linear segment 704 and identify a lower target angular bin by subtracting the snapping tolerance from the angle of the subject angular linear segment 704. These angular bins can then be used to define a search scope for target angular linear segments.

Indeed, as mentioned above, the design guide system 112 can snap angular linear segments based on near collinearity. Thus, the design guide system 112 can snap a subject angular linear segment to a target angular linear segment even if the subject angular linear segment and the target angular linear segment are not quite parallel. Accordingly, in one or more embodiments, the design guide system 112 utilizes angular bins and upper and lower signed distance conditions to identify candidate angular linear segments that are nearly parallel and also near in position to the subject angular linear segment.

As shown in FIG. 7B, in one or more embodiments, the design guide system 112 performs an act 716 of determining a ray for each target angular bin. As shown in FIG. 7B, the design guide system 112 generates a ray for each angular bin and projects the ray through the subject angular linear segment 704. More specifically, in one or more embodiments, the design guide system 112 determines a representative angle (e.g., an average, median, or mode angle) of the angular bins and generates a ray at that representative angle running through the subject angular linear segment 704. Thus, in FIG. 7B, the design guide system 112 generates a ray 718 corresponding to a target angular bin determined at the act 708. Further, as shown in FIG. 7B, the design guide system 112 projects the ray a center point of the subject angular linear segment 704. Although FIG. 7B illustrates a single ray 718, the design guide system 112 can generate a ray for each target angular bin.

In one or more embodiments, the design guide system 112 determines a ray for target angular bins and not for other angular bins. The design guide system 112 can avoid the computational expense of analyzing other angular linear segments by focusing on these target angular bins.

In addition, as shown in FIG. 7B, the design guide system 112 performs an act 720 of determining an upper ray and a lower ray for each target angular bin. To illustrate, in some embodiments, the design guide system 112 determines the upper ray and the lower ray for a target angular bin by adjusting the representative angle of the target angular bin by a snapping tolerance. Further, in one or more embodiments, the design guide system 112 determines angular linear segments from the digital design document having angles within the upper ray and the lower ray of the target angular bin.

Thus, as shown in FIG. 7B, the design guide system 112 analyzes the ray 718. The design guide system 112 adds and subtracts a sapping tolerance to the ray 718 to generate an upper ray 724 and a lower ray 722. The design guide system 112 can similarly determine upper rays and lower rays for the other target angular bins. The design guide system 112 then utilizes these upper and lower rays to determine signed distances for searching for candidate angular linear segments.

For example, as shown in FIG. 7B, the design guide system 112 performs an act 726 of determining upper signed distances and lower signed distances for the target angular bins. More specifically, as shown, the design guide system 112 determines an upper signed distance 730 from the upper ray 724 and a lower signed distance 732 from the lower ray 722. As shown, the signed distances reflect the distance of the upper ray 724 and the lower ray 722 relative to a reference point 728. In addition to generating upper and lower signed distances for the ray 718, the design guide system 112 can determine upper and lower signed distances for the other target angular bins.

Upon determining the upper and lower signed distances, the design guide system 112 also performs an act 734 of searching for candidate angular linear segments utilizing the upper signed distances and lower signed distances. For example, the design guide system 112 can search the angular linear segments from the target angular bins utilizing the upper and lower signed distances 730, 732. Because the target angular bins can be arranged according to signed distance, the design guide system 112 can perform this act using an efficient binary search.

Upon identifying candidate angular linear segments, the design guide system 112 can also perform an act 736 of applying a collinearity snapping tolerance to the candidate angular linear segments. In particular, the design guide system 112 can analyze the angle of the subject angular linear segment 704 relative to angles of the candidate angular linear segments and the collinearity snapping tolerance to determine whether the candidate angular linear segments are in fact nearly collinear. In some embodiments, the design guide system 112 selects a target angular linear segment based on determining that a candidate linear segment satisfies the collinearity snapping tolerance. Additional detail regarding applying the collinearity snapping tolerance is provided below (e.g., in relation to FIG. 7C).

In addition to the collinearity snapping tolerance, the design guide system 112 can also apply other conditions to select a target angular linear segment. For example, if two candidate angular linear segments both satisfy the collinearity snapping tolerance, the design guide system 112 can select the candidate angular linear segment having the smallest collinearity snapping error (as described below in FIG. 7C). In some embodiments, the design guide system 112 selects candidate angular linear segment with the smallest amount of deflection (e.g., angular deflection) relative to the subject angular linear segment. Similarly, the design guide system 112 can select the candidate angular linear segment the smallest distance (e.g., signed distance or distance along a particular axis) relative to the subject angular linear segment.

In one or more embodiments, the design guide system 112 utilizes the following algorithms to present angular snapping guides during translation:

---

Algorithm 3

Translation snapping has input segments of object in translation:
S(1....n)
E: Environmental snappable locations maintained in Data structure ---
Algorithm 3
---

1. For input point segments S(1... n) get best angular alignment segment S - GetBestAngularAlignmentPair( )
2. For the final segment S,
   a. Snapping (described below with regard to FIG. 8)
   b. Show angular alignment hint ---
Algorithm 4 GetBestAngularAlignmentPair ( S(1...n) )
---

1. L = Get Probable Angular Alignments Lines from E GetProbableAngularALignmentsPairs (S(1... n)))
2. For each probable alignment pair in list L
   a. Find the best segment pair based on following conditions taken in order:
      i. Condition for collinearity with Segment (Explained in algorithm 6)
      ii. Condition of minimum deflection between the segment of the pair
      iii. Condition of distance. The segment pair at minimal distance from each other are given priority ---
Algorithm 5 GetProbableAngularALignmentsPairs( S(1...n) )
---

1. For each line segment L in List S
   a. A = Angle of the segment L
   b. Tol = Angular tolerance of the Bins
   c. Find angular bins with following keys within tolerance
      i.    Angle A
      ii.   Angle (A − Tol)
      iii.  Angle (A + Tol)
   d. For each of these angular bins:
      i.    Avg = Average angle of Bin
      ii.   LowerRay = Ray passing through segment S and at the angle(Avg - Tol)
      iii.  Calculate lower Signed Distance of this Ray from Origin
            LowerDist = SignedDistance of LowerRay from Origin
      iv.   UpperRay = Ray passing through segment S and at the angle(Avg +Tol)
      v.    Calculate upper Signed Distance of this Ray from Origin
            UpperDist = Signed Distance of UpperRay from Origin
      vi.   Since the list of Parallel lines is sorted based on Signed distance from Origin, using binary search,
      vii.  L = find the lower bound line using the LowerDist as the key for Binary search
      viii. U = find the upper bound line using the UpperDist as the key for Binary search
      ix.   All the lines within this range of L and U are the Probable angular alignments for the Segment S As discussed above, in one or more embodiments, the design guide system 112 performs translation snapping by determining near collinearity between a subject angular linear segment and a target angular linear segment. FIG. 7C illustrates example digital design documents 720-724 that show examples of the digital design document applying a collinearity snapping tolerance.

In one or more embodiments, the design guide system 112 checks for collinearity between two angular linear segments by determining a slope corresponding to each of the angular linear segments. Further, the design guide system 112 determines a joining angle corresponding to a line segment connecting the endpoints of the two angular linear segments. In some embodiments, the design guide system 112 determines whether the two angular linear segments are within a snapping tolerance of collinearity by determining an error between the slopes of the angular linear segments and an error between the slope of each angular linear segment and the joining angle. The design guide system 112 determines that if each error value satisfies a collinearity snapping tolerance, that the two angular linear segments are collinear or near collinear.

For example, FIG. 7C includes the digital design document 720. The digital design document 720 includes a subject angular linear segment 722 and a candidate linear segment 724 that are parallel (or nearly parallel) but not collinear (or nearly colinear). The design guide system 112 determines and compares a first angle of the subject angular linear segment 722 and a second angle of the candidate angular linear segment 724. Additionally, the design guide system 112 determines a joining angle between the subject angular linear segment 722 and the candidate linear segment 724 by generating a line segment connecting the subject angular linear segment 722 and the candidate angular linear segment 713, and a collinearity snapping tolerance to determine collinearity.

Specifically, the design guide system determines a first angular difference as a difference between the angle of the subject angular linear segment 722 and the angle of the candidate angular linear segment 724 and compares the difference to the collinearity snapping tolerance. Then, the design guide system 112 determines a second angular difference as the difference between the angle of the candidate angular linear segment 724 and the joining angle and compares the difference to the collinearity snapping tolerance. Further, the design guide system 112 determines a third angular difference as the difference between the angle of the candidate angular linear segment 724 and the joining angle and compares the difference to the collinearity snapping tolerance.

For the digital design document 720, the design guide system 112 determines that the first angular difference (e.g., a first collinearity snapping error) satisfies the collinearity snapping tolerance. However, the design guide system 112 also determines that the second angular difference and the third angular difference (e.g., a second collinearity snapping error and third collinearity snapping error) do not satisfy the collinearity snapping tolerance. Thus, the angular linear segments in the digital design document 720 are not collinear or almost collinear.

Further, FIG. 7C illustrates the digital design document 726. The digital design document 726 includes a subject angular linear segment 728 and a candidate angular linear segment 730. As shown in FIG. 7C, the subject angular linear segment 728 and the candidate angular linear segment 730 are not parallel (or nearly parallel) and not collinear (or nearly collinear). The design guide system 112 determines the angle of subject angular linear segment 728 and the candidate angular linear segment 730. Further, the design guide system 112 determines a joining angle of a line segment connecting the subject angular linear segment 728 and the candidate angular linear segment 730.

For the digital design document 726, the design guide system 112 determines a first angular difference as a difference between the angle of the subject angular linear segment 728 and the angle of the candidate angular linear segment 730 and compares the difference to the collinearity snapping tolerance. Then, the design guide system 112 determines a second angular difference as the difference between the angle of the candidate angular linear segment 728 and the joining angle and compares the difference to the collinearity snapping tolerance. Further, the design guide system 112 determines a third angular difference as the difference between the angle of the candidate angular linear segment 730 and the joining angle and compares the difference to the collinearity snapping tolerance.

For the digital design document 726 determines that the first angular distance does not satisfy the collinearity snapping tolerance. Further, the design guide system 112 also determines that the second angular distance and the third angular distance do not satisfy the collinearity snapping tolerance. Thus, the subject angular linear segment 728 and the candidate angular linear segment 730 in the digital design document 720 are not collinear or almost collinear.

FIG. 7C also illustrates the digital design document 732. The digital design document 732 includes a target angular linear segment 734 and a candidate angular linear segment 736. As shown in FIG. 7C, the target angular linear segment 734 and the candidate angular linear segment 736 are collinear (or nearly collinear within a collinearity snapping tolerance). The design guide system 112 determines the angle of the target angular linear segment 734 and the angle of the candidate angular linear segment 736. Additionally, similar to the discussion above, the design guide system 112 determines a joining angle of a line segment connecting the target angular linear segment 734 and the candidate angular linear segment 736.

For the digital design document 732, the design guide system 112 determines a first angular difference as a difference between the angle of the subject angular linear segment 734 and the angle of the candidate angular linear segment 736 and compares the difference to the collinearity snapping tolerance. Then, the design guide system 112 determines a second angular difference as the difference between the angle of the candidate angular linear segment 734 and the joining angle and compares the difference to the collinearity snapping tolerance. Further, the design guide system 112 determines a third angular difference as the difference between the angle of the candidate angular linear segment 736 and the joining angle and compares the difference to the collinearity snapping tolerance.

Accordingly, for the digital design document 732, the design guide system 112 determines that each of the first angular difference, the second angular difference, and the third angular difference satisfy the collinearity snapping tolerance. Thus, the target angular linear segment 734 and the candidate angular linear segment 736 are collinear or almost collinear. Thus, in one or more embodiments, the design guide system 112 determines that the candidate angular linear segment 736 is a target angular linear segment for the subject angular linear segment 734.

In one or more embodiments, the design guide system 112 utilizes the following computer-implemented algorithm to identify collinearity and almost collinearity among angular linear segments in a digital design document:

Algorithm 6 Almost Collinear Detection

Require: location/segment to compare, $\varepsilon$ snapping tolerance
1:    procedureCOLLINEAR($l_1,l_2,\varepsilon$) ◁ This will check if location $l_1$ is almost collinear with $l_2$.
2:       $\theta_1 \leftarrow$ angle of $l_1$
3:       $\theta_2 \leftarrow$ angle of $l_2$
4:       $\theta_{12} \leftarrow$ angle of line formed by joining end point of $l_1$ and start of $l_2$
5:       error $\leftarrow \max(|\theta_1 - \theta_2|, |\theta_1 - \theta_{12}|, |\theta_2 - \theta_{12}|)$
6:       if error $< \varepsilon$ then
7:          return error, true
8:       return error, false As discussed above, in one or more embodiments, the design guide system 112 snaps a subject angular linear segment onto an angular snapping guide. However, as mentioned previously, the design guide system 112 can snap two segments during a translation that are nearly (but not quite) parallel. Because the two segments may not be exactly parallel (and the user may not want the two segments to be exactly parallel), the design guide system 112 can rotate and translate a digital design object simultaneously to precisely align the subject angular linear segment with the target angular linear segment.

Figure 8:
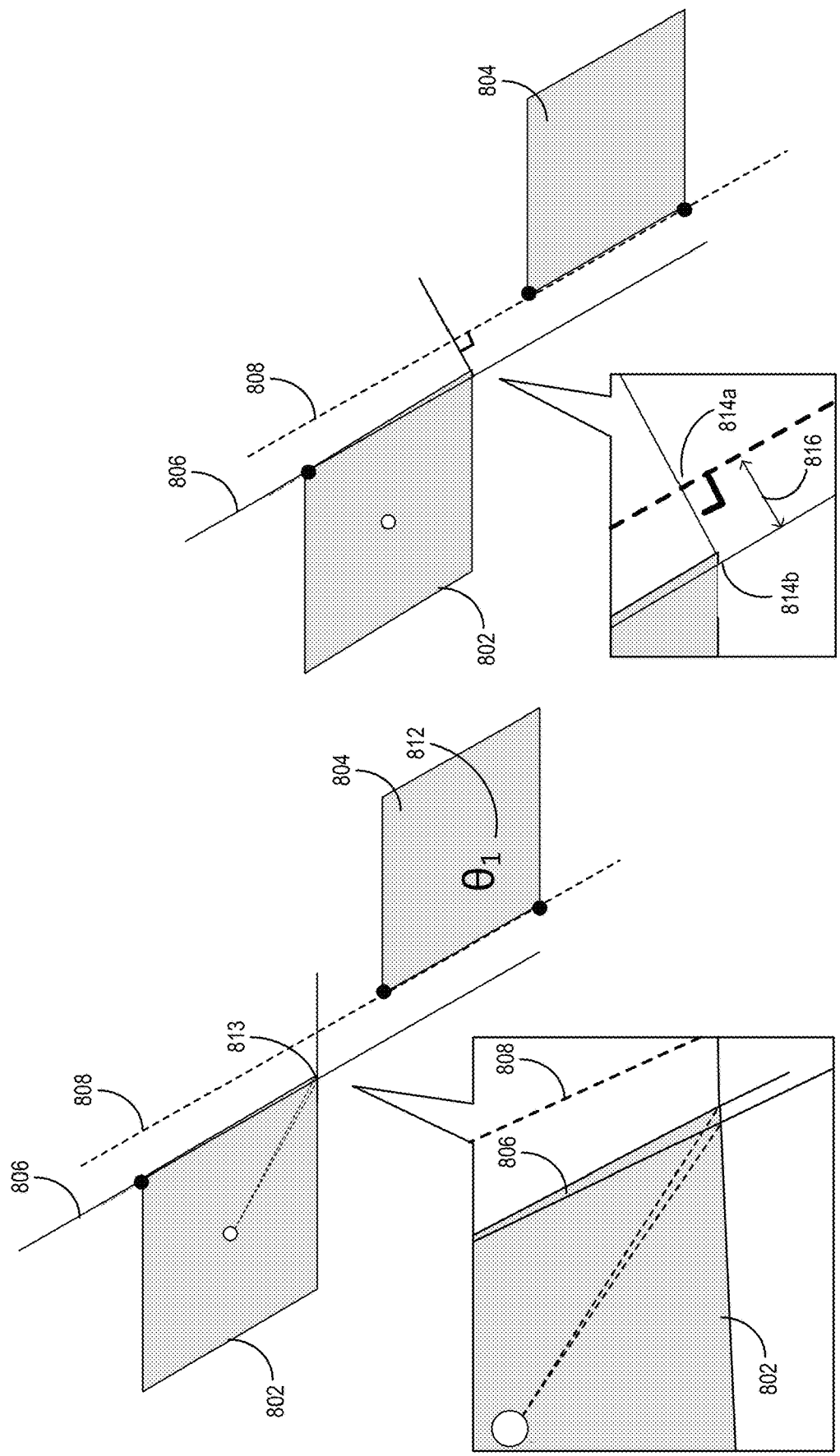
FIG. 8 illustrates a drawing of snapping a digital design object onto a candidate angular snapping guide in accordance with one or more embodiments.

FIG. 8 illustrates the design guide system 112 managing this snapping. More specifically, the design guide system 112 snaps a subject angular linear segment by precisely aligning the subject angular linear segment with the snappable location collinearly. In one or more embodiments, the design guide system 112 snaps the subject angular linear segment by detecting a reference point for transformation, generating a transformation matrix (including both a rotation and orientation) based on the received transformation, and applying the transformation matrix.

To illustrate, FIG. 8 shows digital design objects 802, 804 including a subject angular linear segment 806 and an angular snapping guide 808. More specifically, FIG. 8 illustrate a process for the design guide system 112 translating and rotating a digital design object during a translation operation to ensure that the resulting modified digital design object is collinear. The design guide system 112 receives a translation at the digital design object 802. In response to receiving the translation, the design guide system 112 identifies a target angular linear segment at the digital design object 804. Accordingly, the design guide system 112 snaps the subject angular linear segment of the digital design object 802 onto the angular snapping guide 806. However, because the subject angular linear segment and the target angular linear segment are not parallel, the design guide system 112 needs to translate and rotate the digital design object 806 to make the subject angular linear segment collinear to the target angular linear segment.

Thus, as shown in FIG. 8, the design guide system 112 can snap an angular linear segment based on receiving a translation to the digital design object 802 by both translating and rotating the digital design object 802. In some embodiments, the design guide system 112 snaps the digital design object in part by snapping the subject angular linear segment 806 to be collinear with the angular snapping guide 808. Thus, in one or more embodiments, the design guide system 112 determines a snapping distance 816 to move the subject angular linear segment 806 into collinearity with the digital design object 804.

Further the design guide system 112 rotates the object around a particular rotation point (e.g., the centroid or center of gravity of the shape) to align the subject angular linear segment parallel to the target angular linear segment. Thus, in one or more embodiments, the design guide system 112 tracks a point during the rotation to determine a modified location of the point and then projects this rotated point perpendicularly to the angular snapping guide. To illustrate, the design guide system 112 identifies a rotated endpoint 814*b* and projects the endpoint 814*b* of the subject angular linear segment 806 perpendicularly onto the angular snapping guide 808 to generate a projected point 814*a*. More specifically, the design guide system 112 determines a vector reflecting this projection. For example, the design guide system 112 determines the distance and angle between the rotated point and the projected point.

Thus, in some embodiments, the design guide system 112 determines the snapping distance 816 (e.g., a snapping translation vector) by determining the distance between the projected point 814*a* and the endpoint 814*b*. Accordingly, in one or more embodiments, the design guide system 112 snaps the subject angular linear segment 806 into collinearity with the angular snapping guide 808 by snapping the digital design object 802 according to the snapping distance 816.

In one or more embodiments, the design guide system 112 applies a transformation matrix including the determined translation and rotation to make the target angular linear segment and the angular snapping guide collinear. To illustrate, the design guide system 112 generates a transformation matrix based on the above-determined snapping translation vector and rotation angle. However, in some embodiments, the design guide system 112 can implement only a translation in response to receiving a translation user input. In such circumstances, the design guide system 112 will only translate a digital design object according to the snapping translation vector.

Although FIG. 8 illustrates translation of an entire digital design object, in some embodiments, the design guide system 112 only translates a portion of a digital design object (e.g., by modifying a particular control point to stretch subsegments of the object). In one or more embodiments, the design guide system 112 can modify digital design documents by snapping angular linear segments onto angular snapping guides during a full or partial object transformation. As will be described in greater detail with regard to FIG. 11, the design guide system 112 modifies digital design documents based on receiving re-shaping of a digital design object and/or other partial transformations to a digital design object.

In one or more embodiments, the design guide system 112 utilizes the following computer-implemented algorithm to identify collinearity and almost collinearity among angular linear segments in a digital design document:

---
Algorithm 7 Angular Translation Snapping
---
Require: location/segment pair of environment ($l_s$) and subject ($l_e$), ε snapping tolerance, Input
Subject which is transformed S
procedureTRANSSNAPPING($l_s,l_e,ε$)

---
-continued

---
Algorithm 7 Angular Translation Snapping
---
pt ← point on $l_s$ which is on exact parallel line to $l_e$
p$θ_{l_s}$ −$θ_{l_e}$ ← rotation of $l_s$ w.r.t $S_{center}$ to make $l_s$ parallel to $l_e$ p'$_t$ ← rotated pt
p"$_t$ ← projection of p'$_t$ onto $l_e$
Δt ← |p"$_t$ − p'$_t$|
Apply Δt on fully or partially selected object.

---

Figure 9A:
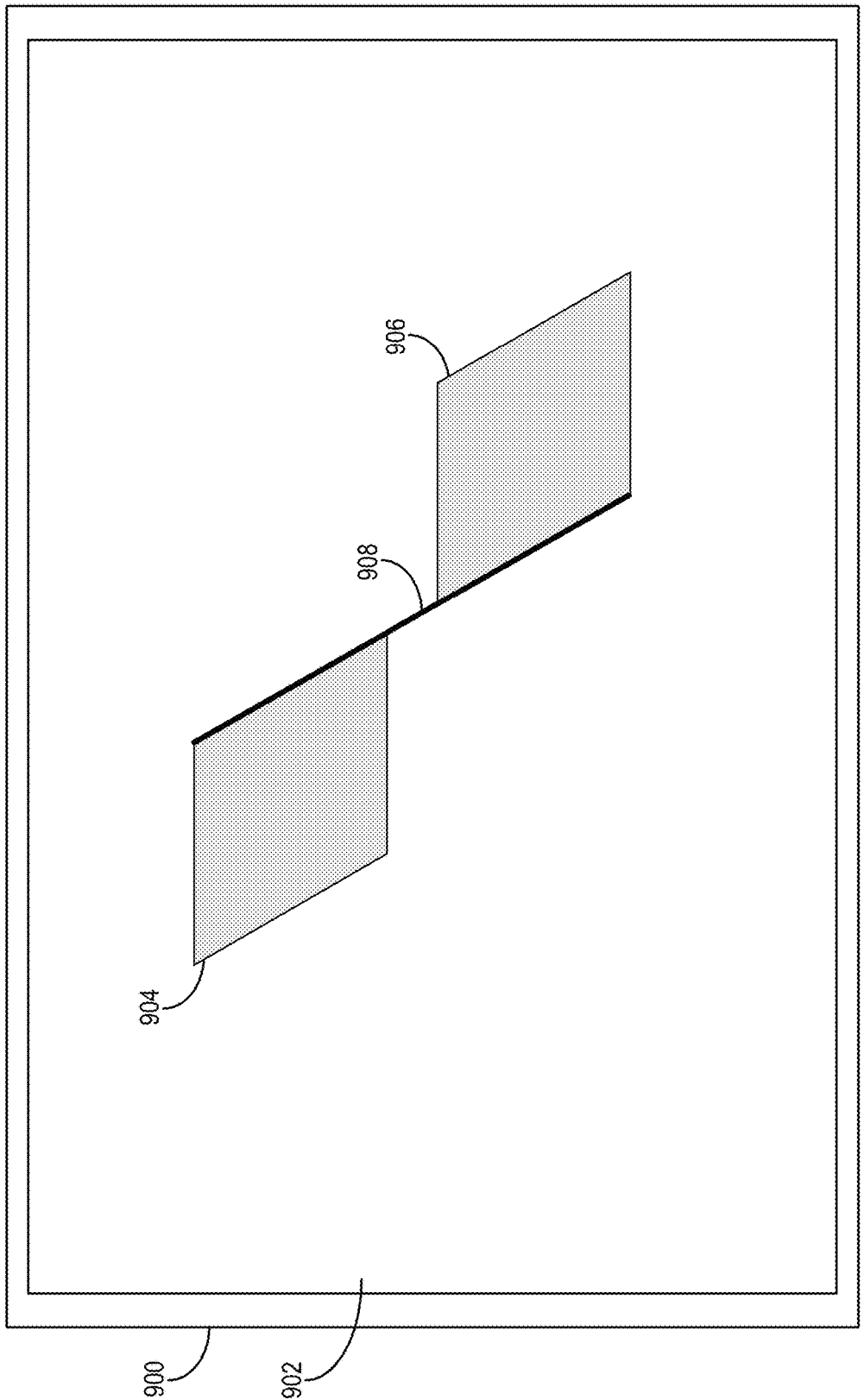
FIGS. 9A-9B illustrate a drawing of angular translation snapping in accordance with one or more embodiments.
Figure 9B:
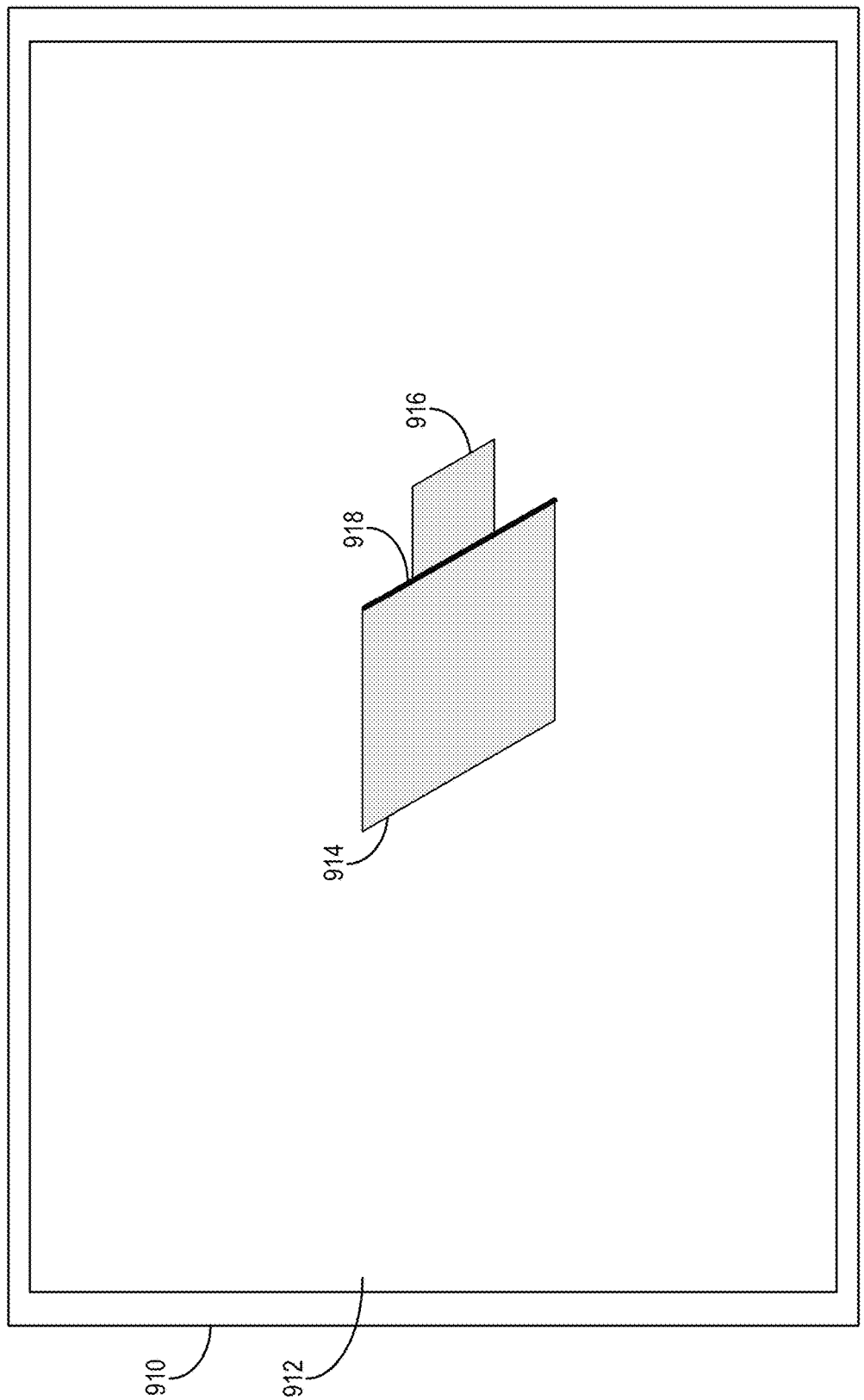

Also, as discussed above, in one or more embodiments the design guide system 112 provides a visual representation of an angular snapping guide at a snappable location in response to a subject angular linear segment coming within a snapping tolerance of the angular snapping guide. FIGS. 9A-9B illustrate generating and presenting angular snapping guides in different organizations of digital design objects. In one or more embodiments, the design guide system 112 provides a visual representation of an angular snapping guide by displaying a line along the snappable location between the two outermost endpoints.

For example, FIG. 9A illustrates a client device 900 presenting a digital design document 902 including digital design objects 904, 906. The design guide system 112 generates an angular snapping guide 908 and displays the snappable location between the two outermost endpoints. To illustrate, the design guide system 112 displays the angular snapping guide from the top of the digital design object 904 to the bottom of the digital design object 906.

Additionally, FIG. 9B illustrates a client device 910 presenting a digital design document 912 including digital design objects 914, 916. The design guide system 112 generates an angular snapping guide 918. To illustrate, the design guide system 112 determines that the outermost endpoints of the angular snapping guide 918 along two digital design objects 914, 916 are both endpoints on the digital design object 914. Thus, the design guide system 112 provides the angular snapping guide along the length of the digital design object 914.

Although FIGS. 9A-9B illustrate particular angular snapping guide visual representations, the design guide system 112 can provide a variety of visual representations of angular snapping guides. For example, the design guide system 112 can provide visual representations of angular snapping guides at various snappable locations corresponding to a target angular linear segment. To illustrate, the design guide system 112 can provide a visual representation of an angular snapping guide both at the snappable location corresponding to a subject angular linear segment and extending from the target angular linear segment itself. Additionally, the design guide system 112 can provide visual representations of an angular snapping guide by varying line thickness, line color, or some other feature.

Figure 10:
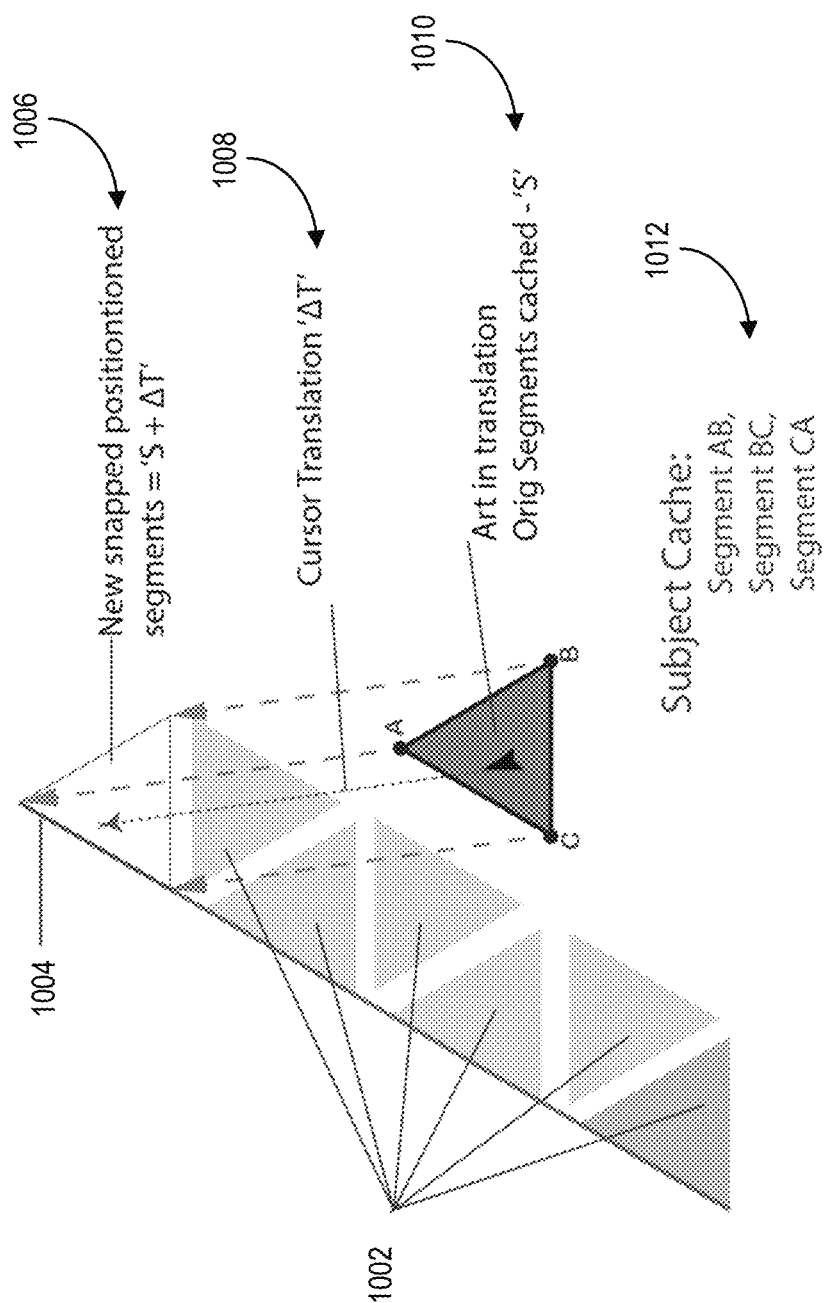
FIG. 10 illustrates a drawing of caching subject angular linear segments in accordance with one or more embodiments.

As mentioned above, in one or more embodiments, the design guide system 112 improves efficiency by caching angular linear segments from a digital design document. FIG. 10 illustrates a process for caching angular linear segments and updating the cache in response to receiving a transformation. To illustrate, FIG. 10 shows digital design objects 1002 aligned with an angular snapping guide 1004 and a subject digital design object 1010.

In one or more embodiments, the design guide system 112 caches the locations of angular linear segments corresponding to the digital design objects 1002. Additionally, in one or more embodiments, the design guide system 112 caches angular linear segments corresponding to the subject digital design object 1010. As shown in FIG. 10, the design guide system 112 generates the subject cache 1012 including angular linear segments corresponding to the subject digital design object 1010.

In one or more embodiments, the cache is part of a larger cache for all angular linear segments in a digital design document. To illustrate, in some embodiments, the design guide system 112 generates a cache for the entire digital design document 902, 912. Further, in one or more embodiments, the cache can include a binning data structure of angular bins described above. Accordingly, the design guide system 112 need not recreate the binning data structure of angular bins in response to each modification of a digital design document. Instead, the design guide system 112 applies transformation to the transformed angular linear segments and, accordingly, updates the binning data structure for the transformed angular linear segments.

As shown in FIG. 10, the design guide system 112 receives user input translating the subject digital design object 1010. More specifically, the design guide system 112 receives a translation 1008. In response to receiving the user input of the cursor translation 1008, the design guide system 112 snaps the subject digital design object into its snapped position 1006.

In one or more embodiments, the design guide system 112 updates the cache 1012 for future use during future translations within a digital design document. In order make this cache reusable, the design guide system 112 applies the received transformation to the cached angular linear segments in the subject cache 1012. More specifically, in one or more embodiments, the design guide system 112 determines a transformation matrix based on the received transformation. Accordingly, in some embodiments, the design guide system 112 applies the determined transformation matrix to the cached angular linear segments in the subject cache 1012. Thus, the design guide system 112 updates the cache for the digital design document without needing to check each angular linear segment for updates.

In one or more embodiments, the design guide system 112 caches a cursor location in addition to caching locations of angular linear segments in a digital design document. Moreover, in some embodiments, the design guide system 112 can cache a single angular linear segment, a set of angular linear segments, and/or a digital design object. Though FIG. 10 illustrates transformation of an entire digital design object, in some embodiments, the design guide system 112 can cache and apply a transformation to any one of these digital items.

Figure 11:
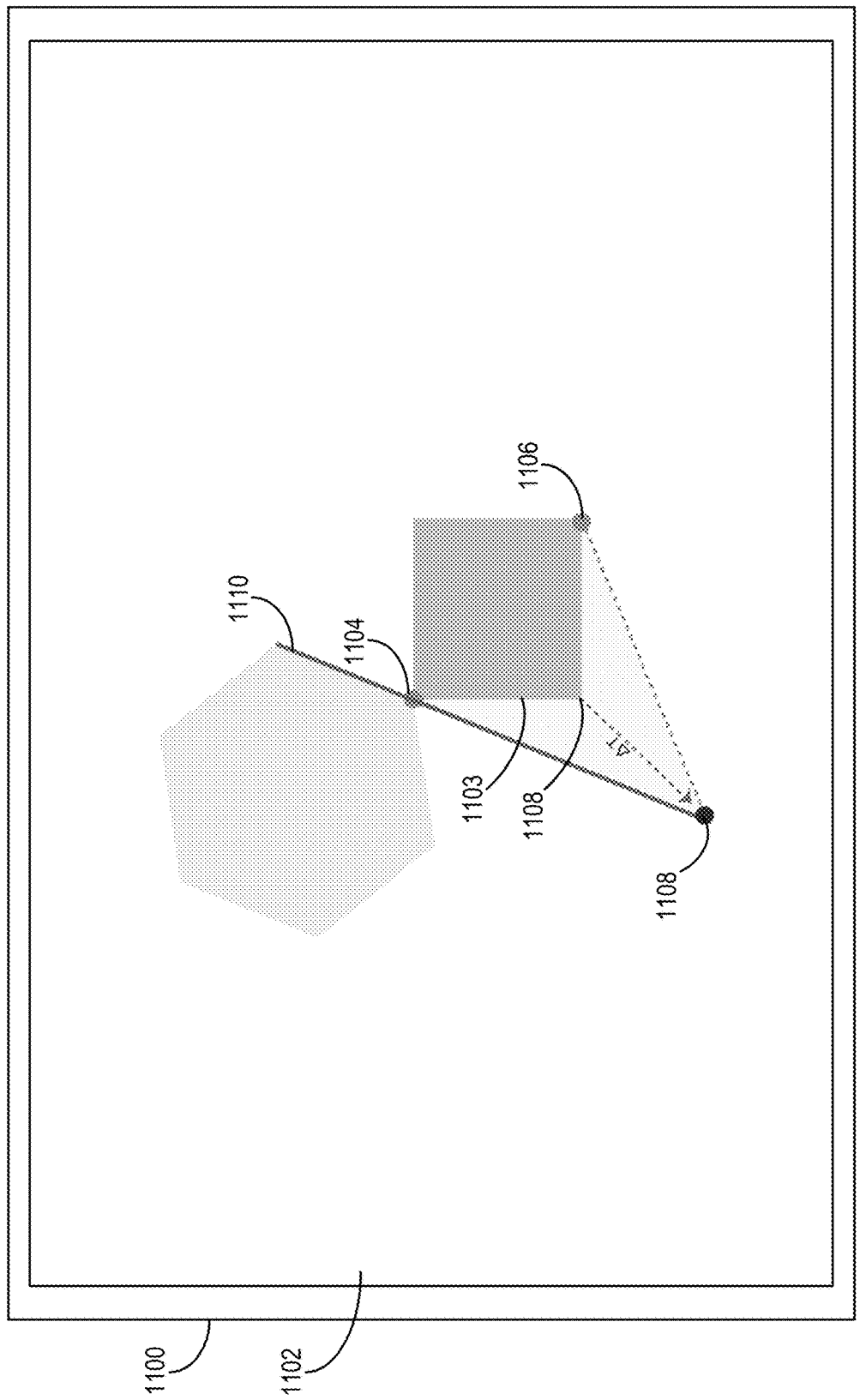
FIG. 11 illustrates a drawing of the design guide system providing angular snapping guides in response to user interaction with a segment of a digital design object in accordance with one or more embodiments.

As discussed briefly above, the design guide system 112 can provide angular snapping guides in response to transformations within a digital design document to a portion of a digital design object. To illustrate, in one or more embodiments, the design guide system 112 receives and implements a transformation to an angular linear segment of a digital design object without transformation to other angular linear segments of the digital design object. FIG. 11 illustrates an example presentation of an angular snapping guide in response to such a transformation.

More specifically, FIG. 11 illustrates a client device 1100 presenting a digital design document 1102. The design guide system 112 receives user input re-shaping a digital design object 1103. The design guide system 112 receives user input at the point 1108. Based on this user input, the design guide system 112 moves the point 1108, but does not move the points 1104, 1106. The design guide system 112 determines that, based on this partial transformation to the digital design object 1103, subject angular linear segments 1103 come within a snapping tolerance of a snappable location corresponding to the angular linear segment 1110.

Thus, the design guide system 112 identifies the angular linear segment 1110 as a target angular linear segment corresponding to the transformation to the point 1108. Accordingly, in one or more embodiments, the design guide system 112 provides an angular snapping guide corresponding to the angular linear segment 1110. Additionally, in some embodiments, the design guide system 112 snaps the subject angular linear segment 1103 onto the angular snapping guide 1110. However, instead of translating the entire digital design object, the design guide system 112 determines a translation of the point 1108 needed to bring the subject angular linear segment 1103 into collinearity with the angular snapping guide 1110. For example, in one or more embodiments, instead of applying a rotation or translation operation, the design guide system 112 snaps (e.g., translates) the point 1108 to an extension of the target angular linear segment.

Figure 12:
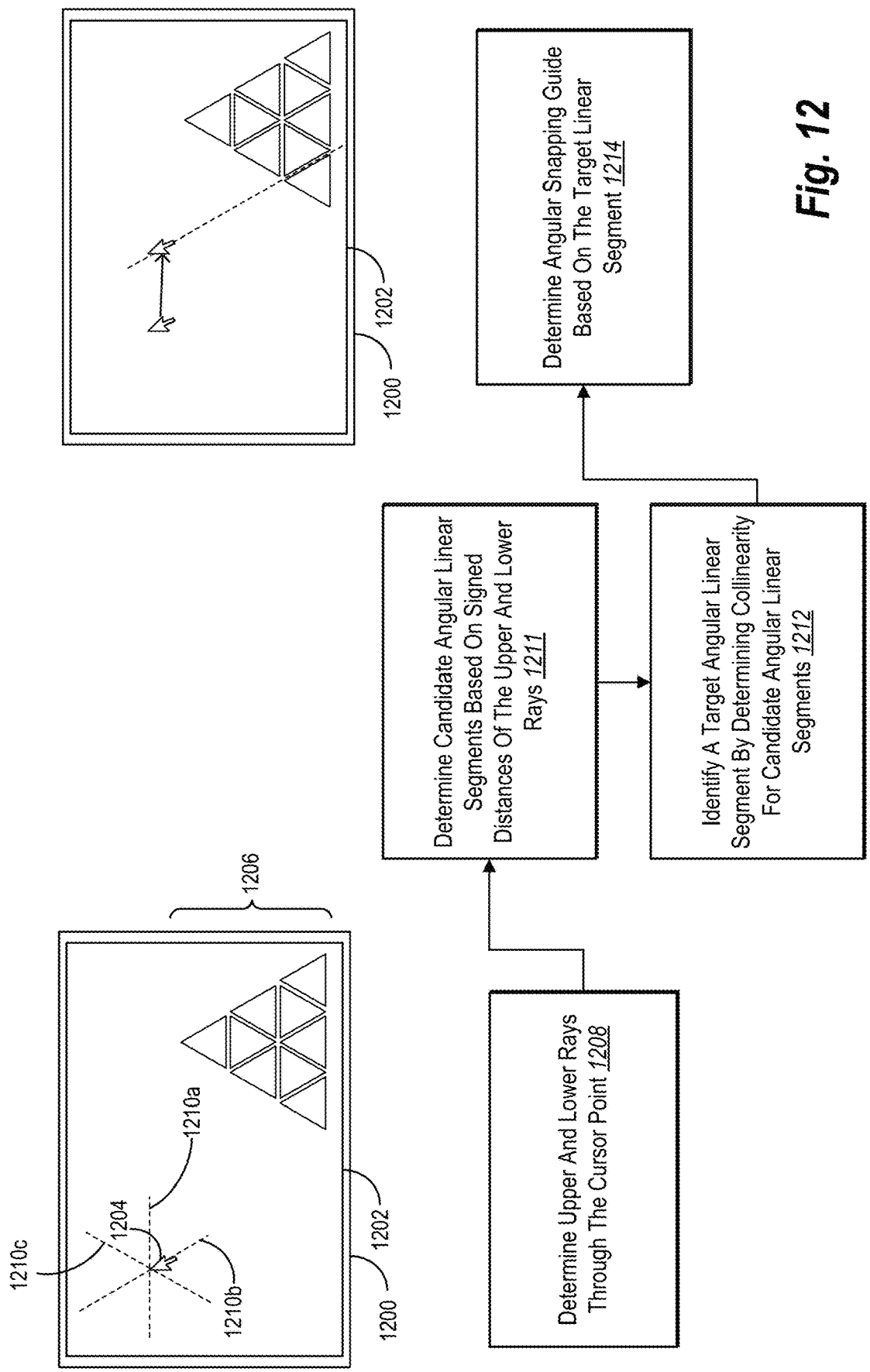
FIG. 12 illustrates a drawing of providing angular snapping guides during partial modification of a digital design object in accordance with one or more embodiments.

As mentioned above, in one or more embodiments, the design guide system 112 snaps a cursor utilizing angular snapping guides. FIG. 12 illustrates a process for snapping a cursor onto an angular snapping guide in accordance with one or more embodiments. More specifically, FIG. 12 illustrates a client device 1200 displaying a digital design document 1202 including a cursor 1204 and digital design objects 1206.

As illustrated in FIG. 12, the design guide system 112 can perform an act 1208 of determining upper and lower rays through the cursor point. To illustrate, in one or more embodiments, the design guide system 112 determines a ray 1210a-1210c for each representative angle of each angular bin (and generates the ray passing through the cursor 1204). In one or more embodiments, the design guide system 112 determines a representative angle for each angular bin as an average angle for each angular bin. As shown in FIG. 12, and similarly to the discussion above with regard to FIG. 7B, the design guide system 112 projects the rays 1210a-1210c corresponding to angular bins through the cursor 1204 at the cursor point.

Further, in one or more embodiments, the design guide system 112 determines an upper and lower ray corresponding to each representative (e.g. average) angle of an angular bin. In one or more embodiments, the design guide system 112 determines upper and lower rays for the rays 1210a-1210c by applying a snapping tolerance (e.g., adding and subtracting the snapping tolerance) to the angle of the ray. In some embodiments, the design guide system 112 determines the upper and lower rays for each angular bin.

Additionally, as shown in FIG. 12, the design guide system 112 can perform an act 1211 of determining candidate angular linear segments based on signed distances of the upper and lower rays. To illustrate, in one or more embodiments the design guide system 112 determines a signed distance for each upper ray and each lower ray from a reference point (e.g. the origin) in the digital design document 1202. Accordingly, the design guide system 112 utilizes the signed distances to determine candidate angular linear segments for the cursor 1204. More specifically, in one or more embodiments, the design guide system 112 utilizes the signed distances corresponding to the upper and lower rays to perform a binary search within the angular bins. To illustrate, the design guide system 112 utilizes the upper signed distance and the lower signed distances as keys for a binary search of the angular bins and utilizes the returned angular linear segments as candidate angular linear segments.

As also shown in FIG. 12, in one or more embodiments, the design guide system 112 performs an act 1212 of identifying a target angular linear segment by determining collinearity for candidate angular linear segments. More specifically, the design guide system 112 determines collinearity between a point corresponding to the cursor and the determined candidate angular linear segments. To illustrate, the design guide system 112 determines whether the cursor 1204 point's perpendicular distance from a snappable location corresponding to an angular linear segment is within the snapping distance tolerance.

Further, in one or more embodiments, the design guide system 112 determines a target angular linear segment by determining the smallest perpendicular distance, or a "best match" from the target angular bin. To illustrate, in one or more embodiments, the design guide system 112 selects a target angular linear segment for the cursor 1204 by identifying a candidate angular linear segment having the shortest signed distance to the cursor point of the cursor 1204. In addition or in the alternative, the design guide system 112 can select a target angular linear segment from the candidate angular linear segments as the candidate angular linear segment that minimizes a difference between a joining angle between the candidate angular linear segment and the cursor 1204 and the angle of the candidate angular linear segment.

Accordingly, as also shown in FIG. 12, in some embodiments, the design guide system 112 performs an act 1214 of determining an angular snapping guide based on the target angular linear segment. More specifically, the design guide system 112 generates an angular snapping guide corresponding to the target angular linear segment. In one or more embodiments, the design guide system 112 generates the angular snapping guide at a snappable location corresponding to the angular linear segment.

In one or more embodiments, the design guide system 112 utilizes the following computer-implemented algorithm to snap a cursor onto an angular snapping guide:

---

Algorithm 8 Cursor snapping has 1 input point:
Cursor Position in coordinate space : C(x,y)

---

E: Environmental snappable locations maintained in Data structure
3. For input point C(x,y), get best angular alignment segment S - GetBestAngularAlignment( )
4. For the final segment S,
   a. Snapping:
      i. P = Find the perpendicular projection of the C(x,y) on the ray passing through the Segment S
      ii. Snap the cursor to this new position S
   b. Show angular alignment hint:
      i. Draw line joining the Segment S and snapped cursor position P

---

Algorithm 9 GetBestAngularAlignment( C(x,y) )

---

1. L = Get Probable Angular Alignments Lines from E With Point C(x,y) - GetAngularALignmentsWithPoint( )
2. L1 = From each of the probable alignment in List L, find the segment which are collinear to the point C(xy).
   Condition for collinearity with Point X(x,y):
   Point's perpendicular distance from the linear ray passing through the probable line segment should be within the snapping distance tolerance
3. Further trim down the list L1 on the basis of second condition of nearest distance L2 = From L2, find the segments whose center is at minimum distance from the input point C(x,y)

---

-continued

---

Algorithm 9 GetBestAngularAlignment( C(x,y) )

---

4. Linesegment = From final trimmed down list of segments, find the one with least deflection of angle between segment and moving ray (ray created by joining C(x,y) with nearest end point of segment to C(x,y))

---

---

Algorithm 10 GetAngularALignmentsWithPoint( C(x,y) )

---

1. For each angular bin B in the E
   a. P = list of parallel lines in this bin B
   b. A = average angle of the Bin
   c. Tol = Angular tolerance of the Bins
   d. LowerRay = Ray passing through Point C(x,y) and at the angle(A-Tol)
   e. Calculate lower Signed Distance of this Ray from Origin
      LowerDist = SignedDistance of LowerRay from Origin
   f. UpperRay = Ray passing through Point C(x,y) and at the angle(A+Tol)
   g. Calculate upper Signed Distance of this Ray from Origin
      UpperDist = Signed Distance of UpperRay from Origin
   h. Since the list of Parallel lines is sorted based on Signed distance from
      Origin, using binary search,
         i. L = find the lower bound line using the LowerDist as the key for Binary search
         ii. U = find the upper bound line using the UpperDist as the key for Binary search
   i. All the lines within this range of L and U are the Probable angular alignments for the Input point C(x,y)

---

Figure 13:
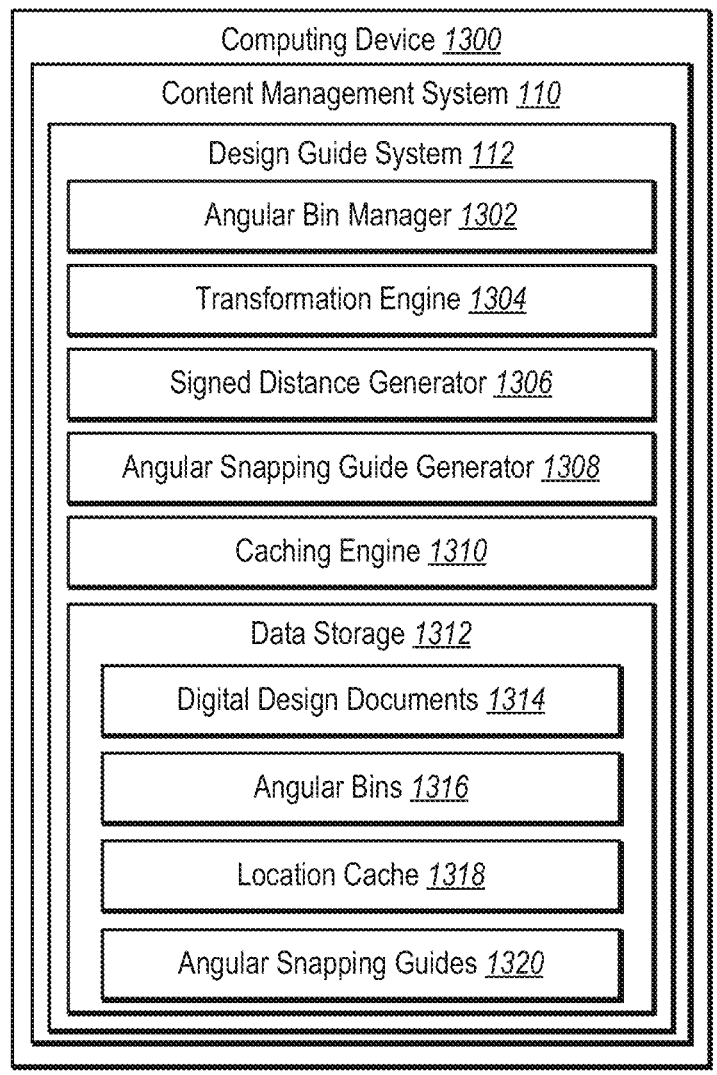
FIG. 13 illustrates a schematic diagram of a design guide system in accordance with one or more embodiments.

Turning now to FIG. 13, this figure provides additional detail regarding components and features of the design guide system 112. In particular, FIG. 13 illustrates a computing device 1300 implementing the content management system 110 and the design guide system 112. The computing device 1300 can include one or more servers (e.g., the server device(s) 108) and/or one or more client devices (e.g., the client device 102). As shown in FIG. 13, the computing device 1300 includes an angular bin manager 1302, a transformation engine 1304, a signed distance generator 1306, an angular snapping guide generator 1308, a caching engine 1310, and a data storage 1312.

As shown in FIG. 13, the computing device 1300 includes the angular bin manager 1302. In one or more embodiments, the angular bin manager 1302 generates angular bins corresponding to a digital design document. Further, in some embodiments, the angular bin manager 1302 assigns angular linear segments to angular bins based on the slope of the angular linear segments. Additionally, in one or more embodiments, the angular bin manager 1302 updates angular bins for an angular linear segment in response to receiving user input transforming the angular linear segment.

Additionally, as shown in FIG. 13, the computing device 1300 includes the transformation engine 1304. In one or more embodiments, the transformation engine 1304 receives and implements transformations to digital design documents. To illustrate, in some embodiments, the transformation engine 1304 dynamically monitors user interaction with digital design documents. For example, in one or more embodiments, the transformation engine 1304 receives and implements translations, rotations, scaling, generation, and other additions and/or modifications of angular linear segments within a digital design document.

Further, as shown in FIG. 13, the computing device 1300 includes the signed distance generator 1306. In one or more embodiments, the signed distance generator 1306 determines signed distances corresponding to angular linear segments within a digital design document. Additionally, in one or more embodiments, the signed distance generator 1306 utilizes the signed distances to organize (e.g. order) angular linear segments within angular bins. In some embodiments, the signed distance generator 1306 determines signed distance as the shortest distance between an angular linear segment and an origin or another fixed point in the digital design document.

Also, as shown in FIG. 13, the computing device 1300 includes the angular snapping guide generator 1308. In one or more embodiments, the angular snapping guide generator 1308 identifies a target angular linear segment in response to response to receiving a transformation of a subject angular linear segment and/or cursor. More specifically, the angular snapping guide generator 1308 can generate an angular snapping guide to extend from or run parallel to a target angular linear segment. To illustrate, the angular snapping guide generator 1308 can determine snappable locations corresponding to the target angular linear segment. Further, in one or more embodiments, the angular snapping guide generator 1308 provides the angular snapping guide in response to determining that the subject angular linear segment is within a snapping tolerance of the snappable locations.

Additionally, as shown in FIG. 13, the computing device 1300 includes the caching engine 1310. In one or more embodiments, the caching engine 1310 caches locations of digital design objects, including angular linear segments (with corresponding signed distances and angles), in a digital design document. Further, in some embodiments, the caching engine 1310 transforms cached locations of the angular linear segments in the cache. Accordingly, in one or more embodiments, the caching engine 1310 generates updated angular snapping guides based on an updated cache.

The computing device 1300 further includes the data storage 1312. The data storage 1312 accesses and stores files, indicators, and other data for the design guide system 112. For example, as shown in FIG. 13, the data storage 1312 includes digital design documents 1314, angular bins 1316, a location cache 1318, and an angular snapping guide 1320.

Each of the components 1302-1312 of the design guide system 112 can include software, hardware, or both. For example, the components 1302-1312 can include one or more instructions stored on a computer-readable storage medium and executable by processors of one or more computing devices, such as a client device or server device. When executed by the one or more processors, the computer-executable instructions of the design guide system 112 can cause the computing device(s) to perform the methods described herein. Alternatively, the components 1302-1312 can include hardware, such as a special-purpose processing device to perform a certain function or group of functions. Alternatively, the components 1302-1312 of the design guide system 112 can include a combination of computer-executable instructions and hardware.

Furthermore, the components 1302-1312 of the design guide system 112 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1302-1312 may be implemented as a stand-alone application, such as a desktop or mobile application. Furthermore, the components 1302-1312 may be implemented as one or more web-based applications hosted on a remote server. The components 1302-1312 may also be implemented in a suite of mobile device applications or "apps." To illustrate, the components 902-912 may be implemented in an application, including but not limited to ADOBE® IILLUSTRATOR, ADOBE® LIGHTROOM, and ADOBE® PHOTOSHOP. "ADOBE", "ADOBE ILLUSTRATOR", "ADOBE LIGHTROOM", and "ADOBE PHOTOSHOP" are either registered trademarks or trademarks of Adobe Inc. in the United States and/or other countries.

Figure 14:
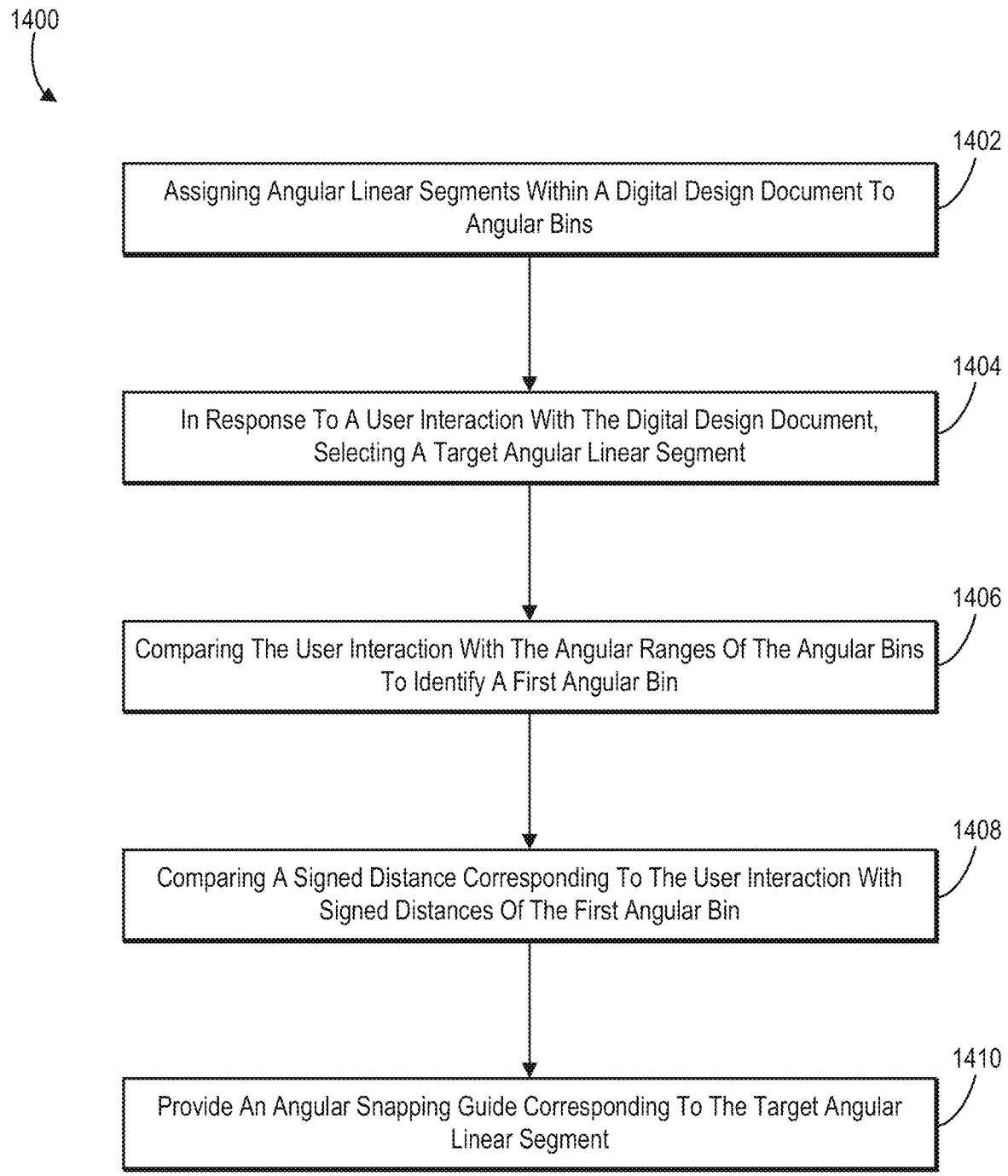
FIG. 14 illustrates a flowchart of a series of acts for providing an angular snapping guide for a target angular linear segment in accordance with one or more embodiments.

FIGS. 1-13, the corresponding text, and the examples provide a number of different methods, systems, devices, and non-transitory computer-readable media of the design guide system 112. In addition to the foregoing, one or more embodiments can also be described in terms of flowcharts comprising acts for accomplishing a particular result, as shown in FIG. 14. FIG. 14 may be performed with more or fewer acts. Further, the acts may be performed in differing orders. Additionally, the acts described herein may be repeated or performed in parallel with one another or parallel with different instances of the same or similar acts.

As mentioned, FIG. 14 illustrates a flowchart of a series of acts 1400 for providing an angular snapping guide for a target angular linear segment in accordance with one or more embodiments. While FIG. 14 illustrates acts according to one embodiment, alternative embodiments may omit, add to, reorder, and/or modify any of the acts shown in FIG. 14. The acts of FIG. 14 can be performed as part of a method. Alternatively, a non-transitory computer-readable medium can comprise instructions that, when executed by one or more processors, cause a computing device to perform the acts of FIG. 14. In some embodiments, a system can perform the acts of FIG. 14.

As shown in FIG. 14, the series of acts 1400 includes an act 1402 for assigning angular linear segments within a digital design document to angular bins. In particular, the act 1402 can include assigning angular linear segments corresponding to one or more digital design objects within a digital design document to angular bins corresponding to angular ranges. Specifically, the act 1402 can include sorting the angular linear segments of the angular bins based on the signed distances of the angular linear segments relative to a reference point in the digital design document. Further, the act 1402 can include sorting the angular linear segments of the angular bins based on the signed distances of the angular linear segments relative to a reference point in the digital design document.

As shown in FIG. 14, the series of acts 1400 includes an act 1404 for comparing the user interaction with the angular ranges of the angular bins to identify a target angular bin. In particular, the act 1404 can include in response to a user interaction with the digital design document, selecting a target angular linear segment from the angular linear segments. Specifically, the act 1404 can include selecting the target angular linear segment by comparing angles of the subset of angular segments that fall within the angular snapping range to the angle of the subject angular linear segment.

Additionally, in one or more embodiments, the act 1404 can include wherein the signed distance corresponding to the user interaction comprises a signed distance of the subject angular linear segment and further comprising instructions that, when executed by the at least one processor, further cause the computer system to select the target angular linear segment by comparing the signed distance of the subject angular linear segment to signed distances of the subset of angular linear segments that fall within the angular snapping range. Additionally, in some embodiments, the act 1404 includes selecting the target angular linear segment from the angular linear segments by identifying the user interaction as a translation of a digital design object of the one or more digital design objects, and identifying, from the first set of angular line segments, the target angular linear segment as a linear segment within a collinearity snapping tolerance to the digital design object.

As shown in FIG. 14, the series of acts 1400 includes an act 1406 for comparing the user interaction with the angular ranges of the angular bins to identify a target angular bin. In particular, the act 1406 can include comparing the user interaction with the angular ranges of the angular bins to identify a target angular bin comprising a first set of angular linear segments. Specifically, the act 1406 can include, in response to a user interaction with a subject digital design object comprising a subject angular linear segment, comparing an angle of the subject angular linear segment with the angular ranges to identify a target angular bin comprising a first set of angular linear segments. Additionally, the act 1406 can include wherein comparing the angle of the target angular linear segment, the angle of the subject angular linear segment, the joining angle, and the collinearity snapping tolerance comprises determining a first angular difference between the angle of the target angular linear segment and the angle of the subject angular linear segment, determining a second angular difference between the angle of the target angular linear segment and the joining angle, determining a third angular difference between the angle of the subject angular linear segment and the joining angle, and comparing the first angular difference, the second angular difference, and the third angular difference to the collinearity snapping tolerance.

As shown in FIG. 14, the series of acts 1400 includes an act 1408 for comparing a signed distance corresponding to the user interaction with signed distances of the target angular bin. In particular, the act 1408 can include comparing a signed distance corresponding to the user interaction with signed distances of the first set of angular linear segments. Specifically, the act 1408 can include identifying a target angular linear segment by performing a search of sorted signed distances of the first set of angular linear segments utilizing a signed distance of the subject digital design object and applying a snapping tolerance.

Additionally, the act 1408 can include identifying the linear segment within the collinearity snapping tolerance to the digital design object by determining an angle of the target angular linear segment, determining an angle of a subject angular linear segment corresponding to the digital design object, determining a joining angle between the target angular linear segment and the subject angular linear segment by joining an endpoint of the target angular linear segment to an endpoint of the subject angular linear segment, and comparing the angle of the target angular linear segment, the angle of the subject angular linear segment, the joining angle, and the collinearity snapping tolerance.

As shown in FIG. 14, the series of acts 1400 includes an act 1410 for providing an angular snapping guide corresponding to the target angular linear segment. In particular, the act 1410 can include providing, for display on the digital design document, an angular snapping guide corresponding to the target angular linear segment. Specifically, the act 1410 can include identifying the user interaction as a rotation of a subject digital design object of the one or more digital design objects comprising a subject angular linear segment, utilizing an angular snapping tolerance together with an angle of the subject angular linear segment to determine an angular snapping range, and identifying a subset of angular linear segments from the first set of angular linear segments that fall within the angular snapping range.

Additionally, in one or more embodiments, the series of acts 1400 includes caching locations of digital design objects, identifying a transformation of the digital design object, and applying the transformation to the cached location of the digital design object to determine updated locations of one or more linear angular segments corresponding to the digital design object.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa).

For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

FIG. 15 illustrates a block diagram of example computing device 1500 (e.g., the server device(s) 108, the client device 102, or the computing device 1500) that may be configured to perform one or more of the processes described above. As shown by FIG. 15, the computing device 1500 can comprise a processor 1502, a memory 1504, a storage device 1506, an I/O interface 1508, and a communication interface 1510, which may be communicatively coupled by way of a communication infrastructure 1512. In certain embodiments, the computing device 1500 can include fewer or more components than those shown in FIG. 15. Components of the computing device 1500 shown in FIG. 15 will now be described in additional detail.

In one or more embodiments, the processor 1502 includes hardware for executing instructions, such as those making up a computer program. As an example, and not by way of limitation, to execute instructions for digitizing real-world objects, the processor 1502 may retrieve (or fetch) the instructions from an internal register, an internal cache, the memory 1504, or the storage device 1506 and decode and execute them. The memory 1504 may be a volatile or non-volatile memory used for storing data, metadata, and programs for execution by the processor(s). The storage device 1506 includes storage, such as a hard disk, flash disk drive, or other digital storage device, for storing data or instructions related to object digitizing processes (e.g., digital scans, digital models).

The I/O interface 1508 allows a user to provide input to, receive output from, and otherwise transfer data to and receive data from computing device 1500. The I/O interface 1508 may include a mouse, a keypad or a keyboard, a touch screen, a camera, an optical scanner, network interface, modem, other known I/O devices or a combination of such I/O interfaces. The I/O interface 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1508 is configured to provide graphical data to a display for presentation to a user. The graphical data may be representative of one or more graphical user interfaces and/or any other graphical content as may serve a particular implementation.

The communication interface 1510 can include hardware, software, or both. In any event, the communication interface 1510 can provide one or more interfaces for communication (such as, for example, packet-based communication) between the computing device 1500 and one or more other computing devices or networks. As an example and not by way of limitation, the communication interface 1510 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1510 may facilitate communications with various types of wired or wireless networks. The communication interface 1510 may also facilitate communications using various communication protocols. The communication infrastructure 1512 may also include hardware, software, or both that couples components of the computing device 1500 to each other. For example, the communication interface 1510 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause the at least one processor to perform operations comprising:
    extracting angular linear segments corresponding to a digital design object within a digital design document, wherein the digital design object comprises an editable vector object and the angular linear segments have a plurality of angles;
    in response to a user interaction indicating a movement within the digital design document, selecting a target angular linear segment from the angular linear segments by comparing the user interaction with the plurality of angles; and
    providing, for display on the digital design document, an angular snapping guide corresponding to the target angular linear segment.

2. The non-transitory computer-readable medium of claim 1, wherein extracting the angular linear segments comprises:
    identifying a curved segment of the digital design object; and
    extracting an angular linear segment of the angular linear segments from the curved segment of the digital design object.

3. The non-transitory computer-readable medium of claim 1, wherein selecting the target angular linear segment from the angular linear segments further comprises sorting the angular linear segments according to signed distances of the angular linear segments.

4. The non-transitory computer-readable medium of claim 1, wherein selecting the target angular linear segment from the angular linear segments further comprises comparing a signed distance corresponding to the user interaction with signed distances of the angular linear segments.

5. The non-transitory computer-readable medium of claim 1, wherein selecting the target angular linear segment from the angular linear segments further comprises:
    identifying a transformation of an additional digital design object corresponding to the user interaction, the transformation comprising at least one of a rotation or translation; and
    modifying the digital design document based on an additional user interaction with the angular snapping guide by aligning the additional digital design object with the angular snapping guide.

6. The non-transitory computer-readable medium of claim 1, wherein selecting the target angular linear segment from the angular linear segments further comprises:
    identifying the user interaction as a rotation of an additional digital design object comprising an additional angular linear segment;
    determining an angular snapping range from an angular snapping tolerance and an angle of the additional angular linear segment; and
    identifying a subset of angular linear segments from the additional angular linear segment based on the angular snapping range.

7. The non-transitory computer-readable medium of claim 6, wherein selecting the target angular linear segment from the angular linear segments further comprises selecting the target angular linear segment by comparing angles of the subset of angular linear segments that fall within the angular snapping range to the angle of the additional angular linear segment.

8. The non-transitory computer-readable medium of claim 6, wherein selecting the target angular linear segment from the angular linear segments further comprises:
    identifying the user interaction as a translation of a further digital design object; and
    identifying, from the angular linear segments, the target angular linear segment as a linear segment within a collinearity snapping tolerance to the digital design object.

9. A system comprising:
    one or more memory devices comprising a digital design document having one or more digital design objects; and
    one or more processors that are configured to cause the system to:
        extract angular linear segments from each of the one or more digital design objects, wherein the one or more digital design objects comprise editable vector objects and the angular linear segments have a plurality of angles;
        detect a user interaction indicating a rotation or a translation of a digital design object of the one or more digital design objects;
        selecting a target angular linear segment from the angular linear segments by comparing the user interaction with the plurality of angles; and
        aligning a subject angular linear segment of the digital design object with an angular snapping guide corresponding to the target angular linear segment.

10. The system of claim 9, wherein the one or more processors are further configured to cause the system to:
    identify a curved segment of at least one digital design object of the one or more digital design objects;
    determine that the curved segment satisfies a threshold curvature; and extract an angular linear segment approximating a slope of the curved segment.

11. The system of claim 9, wherein the one or more processors are further configured to cause the system to select the target angular linear segment from the angular linear segments by:
sorting the angular linear segments according to signed distances of the angular linear segments; and
comparing a signed distance corresponding to the user interaction with the signed distances of the sorted angular linear segments.

12. The system of claim 9, wherein the one or more processors are further configured to cause the system to:
determine that the user interaction comprises the rotation of the digital design object;
determine a subject angle of a subject angular linear segment of the digital design object;
and select the target angular linear segment from the angular linear segments based on the subject angle.

13. The system of claim 9, wherein the one or more processors are further configured to cause the system to:
determine that the user interaction comprises the translation of the digital design object;
determine a subject angle of a subject angular linear segment of the digital design object;
and identify, from the angular linear segments, the target angular linear segment based on a collinearity snapping tolerance and the subject angle.

14. The system of claim 9, wherein the one or more processors are further configured to cause the system to:
cache locations of the one or more digital design objects; and
in response to a transformation of the digital design object, applying the transformation to a cached location of the digital design object to determine updated locations of one or more angular linear segments corresponding to the digital design object.

15. A method comprising:
extracting angular linear segments corresponding to each of one or more digital design objects within a digital design document, wherein the one or more digital design objects comprise editable vector objects and the angular linear segments have a plurality of angles;
selecting a target angular linear segment from the angular linear segments by comparing the plurality of angles with a user interaction corresponding to a digital design object of the one or more digital design objects;
generating an angular snapping guide based on the target angular linear segment; and
modifying the digital design document by aligning the digital design object with the angular snapping guide.

16. The method of claim 15, further comprising extracting the angular linear segments by:
identifying a curved segment of at least one digital design object of the one or more digital design objects; and
extracting an angular linear segment from the curved segment by determining a tangential line corresponding to the curved segment.

17. The method of claim 15, further comprising providing, for display on the digital design document, the angular snapping guide corresponding to the target angular linear segment based on a snapping tolerance.

18. The method of claim 15, further comprising selecting the target angular linear segment by sorting the angular linear segments based on signed distances of the angular linear segments relative to a reference point in the digital design document.

19. The method of claim 18, further comprising selecting the target angular linear segment by comparing a signed distance corresponding to the user interaction with the signed distances of the sorted angular linear segments.

20. The method of claim 15, further comprising selecting the target angular linear segment from the angular linear segments by:
in response to determining that the user interaction comprises a rotation of the digital design object, selecting the target angular linear segment from the angular linear segments by comparing a subject angle of the digital design object with an angle of the target angular linear segment; or
in response to identifying the user interaction as a translation of the digital design object, selecting the target angular linear segment utilizing a collinearity snapping tolerance.

* * * * *